United States Patent
Walter et al.

(10) Patent No.: US 12,426,532 B2
(45) Date of Patent: *Sep. 30, 2025

(54) PLANTING CHARACTERISTIC DETECTION AND CONTROL USING A SEED SENSOR

(71) Applicant: Deere & Company, Moline, IL (US)

(72) Inventors: Jason D. Walter, Bettendorf, IA (US); James Z. Liu, Venice, FL (US)

(73) Assignee: Deere & Company, Moline, IL (US)

( * ) Notice: Subject to any disclaimer, the term of this patent is extended or adjusted under 35 U.S.C. 154(b) by 263 days.

This patent is subject to a terminal disclaimer.

(21) Appl. No.: 17/695,211

(22) Filed: Mar. 15, 2022

(65) Prior Publication Data

US 2022/0217898 A1 Jul. 14, 2022

Related U.S. Application Data

(63) Continuation of application No. 16/437,226, filed on Jun. 11, 2019, now Pat. No. 11,284,559.

(51) Int. Cl.
| | | |
|---|---|---|
| *A01C 7/10* | (2006.01) | |
| *A01C 1/02* | (2006.01) | |
| *A01C 5/06* | (2006.01) | |
| *G05B 15/02* | (2006.01) | |

(52) U.S. Cl.
CPC ............. *A01C 7/105* (2013.01); *A01C 1/025* (2013.01); *A01C 5/062* (2013.01); *G05B 15/02* (2013.01)

(58) Field of Classification Search
CPC ......... A01C 7/105; A01C 1/025; A01C 5/062; A01C 7/102; A01C 7/10; A01C 7/08; A01C 7/00; A01C 1/02; A01C 1/00; A01C 5/06; A01C 5/00; G05B 15/02; G05B 15/00
See application file for complete search history.

(56) References Cited

U.S. PATENT DOCUMENTS

| | | | |
|---|---|---|---|
| 4,307,390 A | 12/1981 | Steffen et al. | |
| 4,555,624 A | 11/1985 | Stefffen | |
| 7,918,168 B2 | 4/2011 | Garner et al. | |
| 8,746,159 B2 | 6/2014 | Garner et al. | |
| 8,850,995 B2 | 10/2014 | Garner et al. | |
| 11,284,559 B2 * | 3/2022 | Walter | A01C 7/102 |
| 2013/0112122 A1 | 5/2013 | Blomme | |
| 2019/0037765 A1 | 2/2019 | Bartelson | |
| 2020/0267355 A1 | 8/2020 | Mentzer | |
| 2020/0390026 A1 | 12/2020 | Walter | |

FOREIGN PATENT DOCUMENTS

| | | |
|---|---|---|
| EP | 3437450 A1 | 2/2019 |
| WO | 2012149398 A1 | 11/2012 |

OTHER PUBLICATIONS

Dickey-john, HY Rate Plus Led Seed Sensor Brochure, 2017, 2 pages.

(Continued)

*Primary Examiner* — Christopher J. Novosad
(74) *Attorney, Agent, or Firm* — Kelly, Holt & Christenson; Joseph R. Kelly

(57) ABSTRACT

A seed sensor senses seeds on a row unit and generates a seed sensor signal. A number of planting characteristics, such as a seed orientation, seed slugging, delivery system wear, and seed abnormalities, can be detected based on the seed sensor signal. The planter can be controlled based on the detected planting characteristics.

17 Claims, 21 Drawing Sheets

(56) References Cited

OTHER PUBLICATIONS

Extended European Search Report and Written Opinion issued in European Patent Application No. 20178883.3, dated Nov. 10, 2020, in 8 pages.
U.S. Appl. No. 16/437,226 Application and Drawings, filed Jun. 11, 2019, 59 pages.

* cited by examiner

PLANTING CHARACTERISTIC DETECTION AND CONTROL USING A SEED SENSOR

CROSS-REFERENCE TO RELATED APPLICATION

The present application is a continuation of and claims priority of U.S. patent application Ser. No. 16/437,266, filed Jun. 11, 2019, the content of which is hereby incorporated by reference in its entirety.

FIELD OF THE DESCRIPTION

The present description relates to agricultural machines. More specifically, the present description relates to using a seed sensor on a planter to detect planting characteristics and generate control signals.

BACKGROUND

There are a wide variety of different types of agricultural machines that plant seeds. Some such agricultural machines include air seeders and planters that have row units (collectively "planters").

As one example, a row unit is often mounted to a planter with a plurality of other row units. The planter is often towed by a tractor over soil where seed is planted in the soil, using the row units. The row units on the planter follow the ground profile by using a combination of a down force assembly that imparts a down force to the row unit to push disk openers into the ground and gauge wheels to set depth of penetration of the disk openers.

The seed can be carried, prior to being planted, by a container or tank on the row unit itself, or it can be pneumatically delivered to the row unit by a grain cart that is also pulled by the tractor. In either case, the seed can be delivered to the furrow by a delivery system.

The discussion above is merely provided for general background information and is not intended to be used as an aid in determining the scope of the claimed subject matter.

SUMMARY

A seed sensor senses seeds on a row unit and generates a seed sensor signal. A number of planting characteristics, such as a seed orientation, seed slugging, (seed misplacement on a delivery system or the ground) delivery system wear, and seed abnormalities, can be detected based on the seed sensor signal. The planter can be controlled based on the detected planting characteristics.

Example 1 is an agricultural machine comprising:
 a furrow opener configured to open a furrow as the agricultural machine moves across a field;
 a seed delivery system configured to deliver seeds to the furrow;
 a seed sensor configured to sense a seed and to generate a seed sensor signal indicative of the seed; and
 a seed abnormality detector configured to detect a characteristic of the seed based on the seed sensor signal and to identify a seed abnormality based on the detected characteristic.

Example 2 is the agricultural machine of any or all previous examples and further comprising:
 a control system configured to generate a control signal to control a controllable subsystem based on the seed abnormality.

Example 3 is the planting machine of any or all previous examples, wherein the controllable subsystem comprises a population control subsystem.

Example 4 is the agricultural machine of any or all previous examples, wherein the control system is configured to generate the control signal to control the population control subsystem to increase a speed of the seed delivery system.

Example 5 is the agricultural machine of any or all previous examples, wherein the control system is configured to generate the control signal to control the population subsystem to increase a speed of a seed metering system, the seed metering system configured to meter seeds to the seed delivery system.

Example 6 is the agricultural machine of any or all previous examples, wherein the seed abnormality detector is configured to detect, as the characteristic of the seed, a spectral characteristic of the seed, and to identify the seed abnormality based on the detected spectral characteristic.

Example 7 is the agricultural machine of any or all previous examples, wherein the seed sensor comprises an image sensor that is configured to generate, as the seed sensor signal, an image of the seed.

Example 8 is the agricultural machine of any or all previous examples, wherein the seed abnormality detector is configured to compare the detected characteristic of the seed to a seed type characteristic, and to identify the seed abnormality based on the comparison.

Example 9 is a method of controlling an agricultural machine comprising:
 generating, with a seed sensor, a seed sensor signal indicative of seed detected moving through the agricultural machine;
 detecting, with a seed abnormality detector, a characteristic of the seed based on the seed sensor signal;
 identifying a seed abnormality based on the detected characteristic of the seed; and
 generating a controllable subsystem of the agricultural machine based on the seed abnormality.

Example 10 is the method of any or all previous examples, wherein the controllable subsystem comprises a population subsystem and wherein generating the control signal comprises:
 generating the control signal to control the population subsystem of the agricultural machine to temporarily increase a speed at which a seed delivery system is configured to deliver seeds to a furrow.

Example 11 is the method of any or all previous examples, wherein the controllable subsystem comprises a population subsystem and wherein generating the control signal comprises:
 generating the control signal to control the population subsystem of the agricultural machine to temporarily increase a speed at which a seed metering system meters seeds to a seed delivery system.

Example 12 is the method of any or all previous examples, wherein generating the seed sensor signal comprises capturing an image of the seed, with the seed sensor, as the seed is moving through the agricultural machine.

Example 13 is the method of any or all previous examples, wherein detecting the characteristic of the seed comprises detecting a spectral characteristic of the seed based on the seed sensor signal and wherein identifying the seed abnormality comprises identifying the seed abnormality based on the detected spectral characteristic.

Example 14 is the method of any or all previous examples, wherein identifying the seed abnormality comprises identifying that the seed detected moving through the agricultural machine is of a different type than a type of the seed that is to be delivered to a furrow opened by the agricultural machine.

Example 15 is an agricultural machine comprising:
a furrow opener configured to open a seed furrow as the agricultural machine moves across a field during a planting operation;
a seed delivery system configured to deliver seeds to the furrow;
a seed sensor configured to sense a seed and to generate a seed sensor signal indicative of the seed; and
a planting characteristic detection system that detects a characteristic of the planting operation based on the seed sensor signal and generates a characteristic signal indicative of the sensed planting characteristic.

Example 16 is the agricultural machine of any or all previous examples, wherein the planting characteristic detection system comprises:
a seed orientation detector configured to detect, as the characteristic of the planting operation, an orientation of the seed in the seed delivery system based on the seed sensor signal.

Example 17 is the agricultural machine of any or all previous examples and further comprising:
a control system configured to generate a control signal to control a controllable subsystem based on the detected orientation of the seed.

Example 18 is the agricultural machine of any or all previous examples, wherein the controllable subsystem comprises a seed orientation subsystem being configurable to change an orientation of the seeds being delivered to the seed delivery system, and wherein the control system is configured to generate the control signal to control the seed orientation subsystem to change an orientation of the seeds being delivery to the seed delivery system.

Example 19 is the agricultural machine of any or all previous examples, wherein the seed sensor is configured to generate the seed sensor signal at a value that varies from a first level indicative of a seed not being detected to a second level indicative of a seed being detected, and wherein the agricultural machine further comprises:
signal width logic that identifies a signal width value indicative of a time for which the seed sensor signal has a value that continuously meets or exceeds the second level.

Example 20 is the agricultural machine of any or all previous examples, wherein the planting characteristic detection system detects, as the characteristic of the planting operation, that a spacing of seeds within the seed delivery system does not satisfy a target spacing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
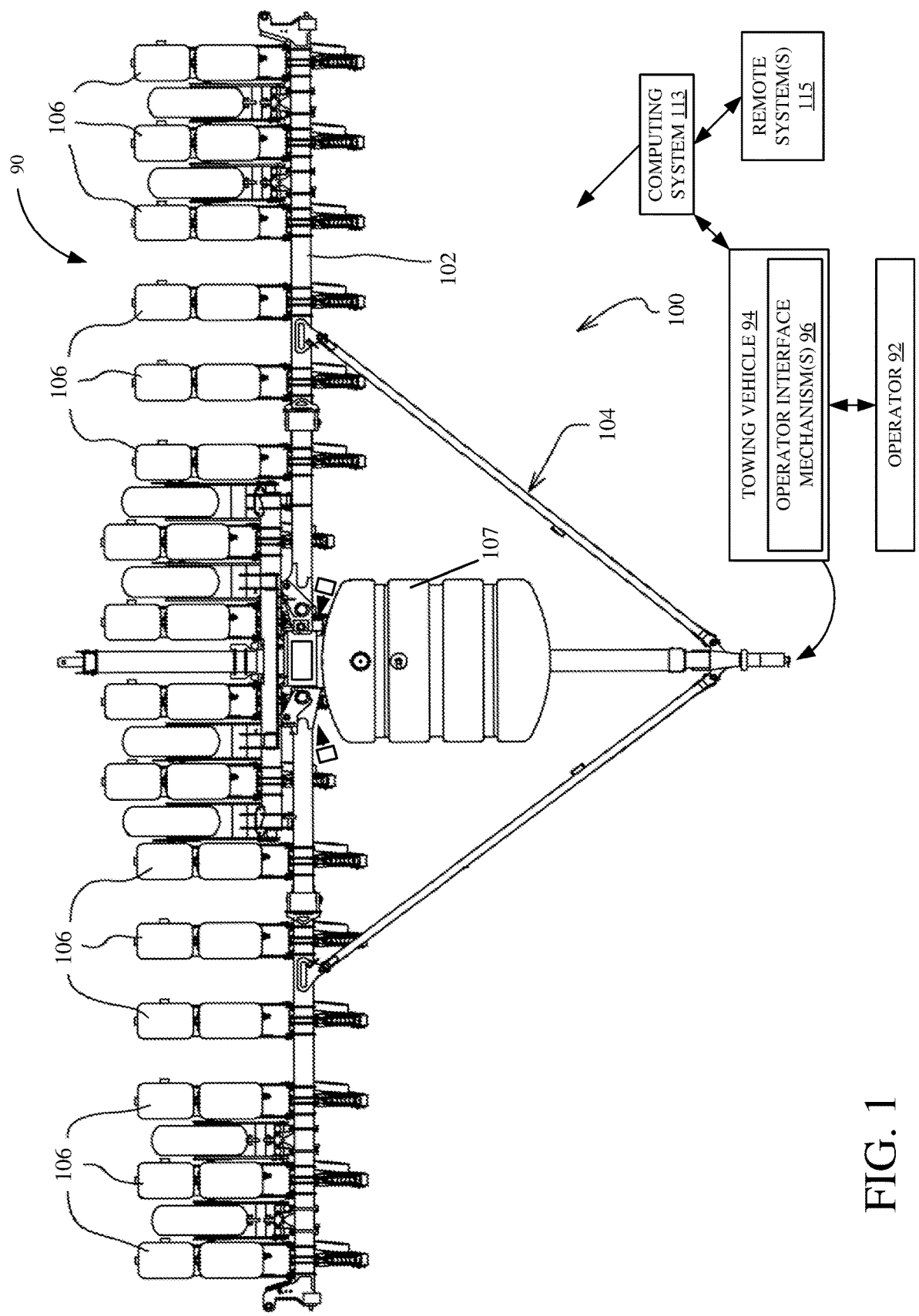
FIG. 1 is a top view of one example of a planting machine, shown in a partial pictorial and partial schematic form.

As discussed above many current systems use planters and/or air seeders in order to plant agricultural crops. Such systems often have a seed sensor that senses a seed as it moves from a storage tank or other seed storage mechanism to a furrow that is opened in the ground by the planter. In some instances, seeds can be misplaced by becoming bunched together (creating a seed slug) so that multiple seeds are moved to the furrow in very close proximity relative to one another, or even adjacent one another or on top of one another. Seed slugging can be caused by a number of different things. In one example, for instance, the delivery system may become worn in a certain way that enhances the likelihood of seed slugging. In another example, foreign material or water may enter the system causing the seeds to group together to form a clump or slug. There are other reasons that seed slugging can occur as well.

In some cases the seed slug can become so large that it clogs part or all of the seed delivery mechanism or other portions of the planter.

In addition, some seeds have an elongate shape (e.g., they are longer in one direction than they are in another direction). For instance, soybean seeds are relatively spherical. However, corn seeds tend to be elongate in one direction. In some systems, the elongate seeds can be moved into the furrow in an undesirable orientation.

Also, in some systems, the crop seed that is being planted may contain anomalous or abnormal seeds. For instance, seeds from certain types of weeds may be very similar in size and shape to the seeds of the agricultural crop being planted. In that case, it can be difficult for a seed vendor (or other seed provider) to separate the anomalous or abnormal seeds from the regular crop seeds. However, it may be that the anomalous or abnormal seeds have a different visual appearance, in that they may be a different color, or have different spectral characteristics, from the crop seeds.

The present description thus proceeds with respect to receiving a seed sensor signal which is indicative of seed presence, and detecting a number of different planter characteristics, based upon the seed sensor signal. In one example, a seed sensor signal will have a certain characteristic (such as a certain peak width) when a singulated seed (a single seed spaced by a predetermined amount from a next seed) is detected but will have a different characteristic (such as a wider peak width) when multiple seeds are detected together in a slug or group. Similarly, it may have one characteristic when the seed is one orientation, and a different characteristic when the seed is in a different orientation. Further, the signal may have one characteristic (such as a spectral characteristic or color) when a crop seed is detected, but a different characteristic (such as a different spectral characteristic or color) when a different type of seed is detected. The present description thus proceeds with respect to detecting these types of planting characteristics and generating output and control signals based upon that detection.

FIG. 1 is a partial pictorial, partial schematic top view of one example of an architecture 90 that includes agricultural planting machine 100, towing vehicle 94, that is operated by operator 92, and computing system 113, which can be on individual parts of machine 100, centrally located on machine 100, or on towing vehicle 94 or distributed. Operator 92 can illustratively interact with operator interface mechanisms 96 to manipulate and control vehicle 94, system 113 and some portions of machine 100.

Machine 100 is a row crop planting machine that illustratively includes a toolbar 102 that is part of a frame 104. FIG. 1 also shows that a plurality of planting row units 106 are mounted to the toolbar 102. Machine 100 can be towed behind towing vehicle 94, such as a tractor. FIG. 1 shows that material, such as seed, fertilizer, etc. can be stored in a tank 107 and pumped, using one or more pumps, through supply lines to the row units. The seed, fertilizer, etc., can also be stored on the row units themselves.

Figure 2:
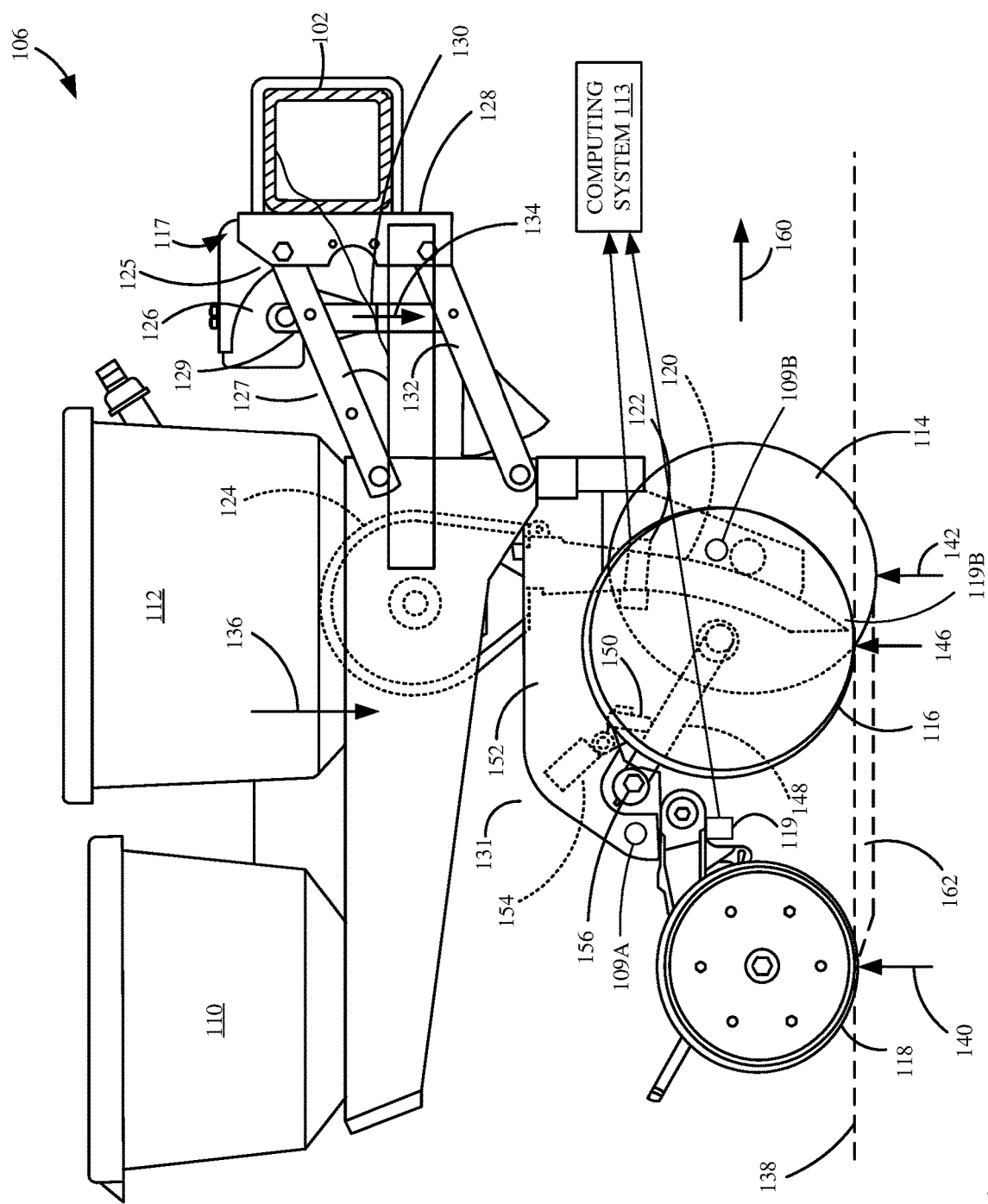
FIG. 2 is a side view showing one example of a row unit of the planting machine illustrated in FIG. 1.

FIG. 2 is a side view showing one example of a row unit 106. In the example shown in FIG. 2, row unit 106 illustratively includes a chemical tank 110 and a seed storage tank 112. It also illustratively includes a disc opener 114 (that opens a furrow 162), a set of gauge wheels 116, and a set of closing wheels 118 (that close furrow 162). Seeds from tank 112 are fed by gravity into a seed meter 124. The seed meter controls the rate at which seeds are dropped into a seed tube 120 or other seed delivery system, such as a brush belt, or flighted belt (both shown below) from seed storage tank 112. The seeds can be sensed by a seed sensor 119 and/or 122.

Some parts of row unit 106 will now be discussed in more detail. First, it will be noted that there are different types of seed meters 124, and the one that is shown is shown for the sake of example only and is described in greater detail below with respect to FIG. 4. For instance, in one example, each row unit 106 need not have its own seed meter. Instead, metering or other singulation or seed dividing techniques can be performed at a central location, for groups of row units 106. The metering systems can include rotatable discs, rotatable concave or bowl-shaped devices, among others. The seed delivery system can be a gravity drop system (such as seed tube 120 shown in FIG. 2) in which seeds are dropped through the seed tube 120 and fall (via gravitational force) through the seed tube and out the outlet end 121 into the furrow (or seed trench) 162. Other types of seed delivery systems are assistive systems, in that they do not simply rely on gravity to move the seed from the metering system into the ground. Instead, such systems actively capture the seeds from the seed meter and physically move the seeds from the meter to a lower opening, where they exit into the ground or trench. Some examples of these assistive systems are described in greater detail below with respect to FIGS. 3 and 5-10.

A downforce actuator 126 is mounted on a coupling assembly 128 that couples row unit 106 to toolbar 102. Actuator 126 can be a hydraulic actuator, a pneumatic actuator, a spring-based mechanical actuator or a wide variety of other actuators. In the example shown in FIG. 2, a rod 130 is coupled to a parallel linkage 132 and is used to exert an additional downforce (in the direction indicated by arrow 134) on row unit 106. The total downforce (which includes the force indicated by arrow 134 exerted by actuator 126, plus the force due to gravity acting on row unit 106, and indicated by arrow 136) is offset by upwardly directed forces acting on closing wheels 118 (from ground 138 and indicated by arrow 140) and double disc opener 114 (again from ground 138 and indicated by arrow 142). The remaining force (the sum of the force vectors indicated by arrows 134 and 136, minus the force indicated by arrows 140 and 142) and the force on any other ground engaging component on the row unit (not shown), is the differential force indicated by arrow 146. The differential force may also be referred to herein as the downforce margin. The force indicated by arrow 146 acts on the gauge wheels 116. This load can be sensed by a gauge wheel load sensor which may be located anywhere on row unit 106 where it can sense that load. It can also be placed where it may not sense the load directly, but a characteristic indicative of that load. For example, it can be disposed near a set of gauge wheel control arms (or gauge wheel arm) 148 that movably mount gauge wheels 116 to shank 152 and control an offset between gauge wheels 116 and the discs in double disc opener 114, to control planting depth. In addition, there may be a down force actuator that increases the down force of the opener 114 (so it can more easily cut through residue, etc.).

Arms (or gauge wheel arms) 148 illustratively abut against a mechanical stop (or arm contact member-or wedge) 150. The position of mechanical stop 150 relative to shank 152 can be set by a planting depth actuator assembly 154. Control arms 148 illustratively pivot around pivot point 156 so that, as planting depth actuator assembly 154 actuates to change the position of mechanical stop 150, the relative position of gauge wheels 116, relative to the double disc opener 114, changes, to change the depth at which seeds are planted.

In operation, row unit 106 travels generally in the direction indicated by arrow 160. The double disc opener 114 opens the furrow 162 in the soil 138, and the depth of the furrow 162 is set by planting depth actuator assembly 154, which, itself, controls the offset between the lowest parts of gauge wheels 116 and disc opener 114. Seeds are dropped through seed tube 120, into the furrow 162 and closing wheels 118 close the soil.

As the seeds are dropped through seed tube 120, they can be sensed by seen sensor 122. Some examples of seed sensor 122 are described in greater detail below. Suffice it to say, for now, that it can be an optical or reflective sensor which includes a radiation transmitter component and a receiver component. The transmitter component emits electro-magnetic radiation and the receiver component then detects the radiation and generates a signal indicative of the presence or absence of a seed adjacent the sensor. Again, some examples of seed sensors are described in greater detail below.

Computing system 113 illustratively receives a seed sensor signal from seed sensor 122, indicating that a seed is passing sensor 122 in seed tube 120. It then detects any of a wide variety of planting characteristics based on the seed sensor signal. As discussed above, each row unit can have its own computing system 113 or a computing system 113 can serve multiple row units. This is all described in greater detail below as well.

Figure 3:
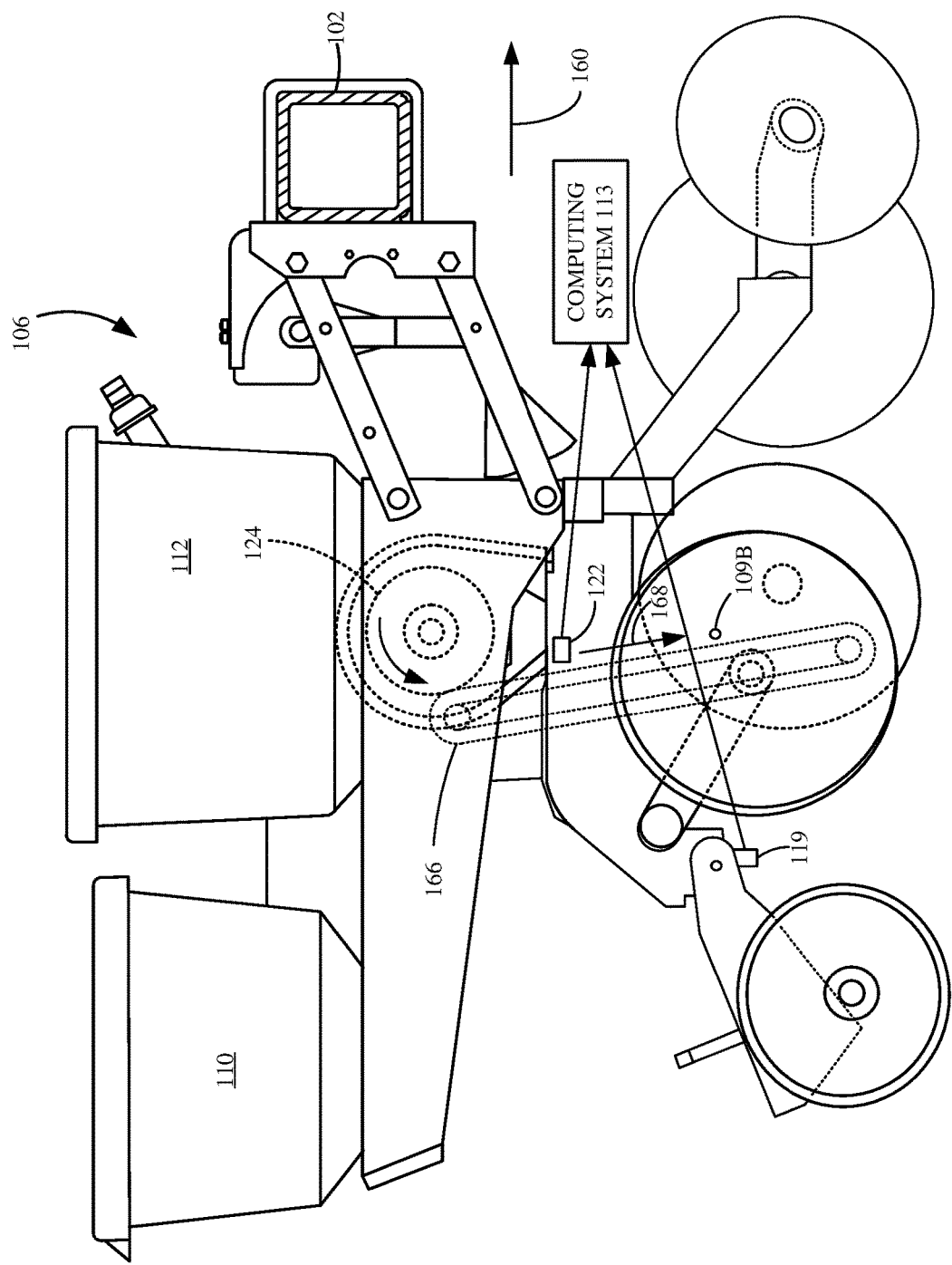
FIG. 3 is a side view showing another example of a row unit of the planting machine illustrated in FIG. 1.

FIG. 3 is similar to FIG. 2, and similar items are similarly numbered. However, instead of the seed delivery system being a seed tube 120 which relies on gravity to move the seed to the furrow 162, the seed delivery system shown in FIG. 3 is an assistive seed delivery system 166. Assistive seed delivery system 166 also illustratively has a seed sensor 122 disposed therein. Seed sensor 119 can be used in addition to, or instead of, sensor 122. It performs in-trench seed sensing, as discussed below. Assistive seed delivery system 166 captures the seeds as they leave seed meter 124 and moves them in the direction indicated by arrow 168 toward furrow 162. System 166 has an outlet end 170 where the seeds exit assistive system 166, into furrow 162, where they again reach their final seed position.

Figure 4:
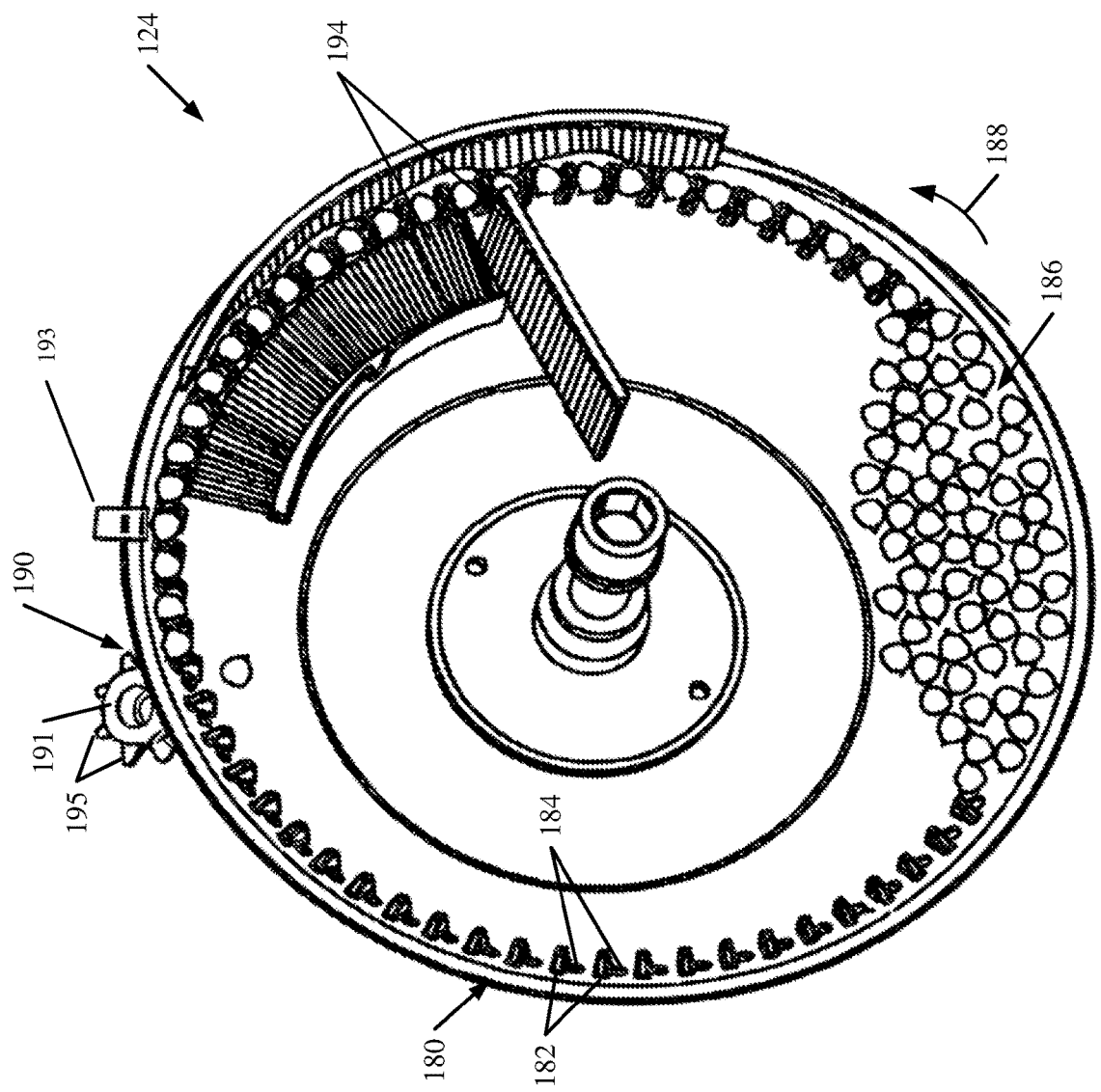
FIG. 4 is a perspective view of a portion of a seed metering system.

FIG. 4 shows one example of a rotatable mechanism that can be used as part of the seed metering system (or seed meter) 124. The rotatable mechanism includes a rotatable disc, or concave element, 180. Concave element 180 has a cover (not shown) and is rotatably mounted relative to the frame of the row unit 106. Rotatable element 180 is driven by a motor (not shown) and has a plurality of projections or tabs 182 that are closely proximate corresponding apertures 184. A seed pool 186 is disposed generally in a lower portion of an enclosure formed by rotating mechanism 180 and its corresponding cover. Rotatable element 180 is rotatably driven by its motor (such as an electric motor, a pneumatic motor, a hydraulic motor, etc.) for rotation generally in the direction indicated by arrow 188, about a hub. A pressure differential is introduced into the interior of the metering mechanism so that the pressure differential influences seeds from seed pool 186 to be drawn to apertures 184. For instance, a vacuum can be applied to draw the seeds from seed pool 186 so that they come to rest in apertures 184, where the vacuum holds them in place. Alternatively, a positive pressure can be introduced into the interior of the metering mechanism to create a pressure differential across apertures 184 to perform the same function.

Once a seed comes to rest in (or proximate) an aperture 184, the vacuum or positive pressure differential acts to hold the seed within the aperture 184 such that the seed is carried upwardly generally in the direction indicated by arrow 188, from seed pool 186, to a seed discharge area 190. It may happen that multiple seeds are residing in an individual seed cell. In that case, a set of brushes or other members 194 that are located closely adjacent the rotating seed cells tend to remove the multiple seeds so that only a single seed is carried by each individual cell. Additionally, a seed sensor 193 can also illustratively be mounted adjacent to rotating element 180. It generates a signal indicative of seed presence and this may be used by system 113, as will be discussed in greater detail below.

Once the seeds reach the seed discharge area 190, the vacuum or other pressure differential is illustratively removed, and a positive seed removal wheel or knock-out wheel 191, can act to remove the seed from the seed cell. Wheel 191 illustratively has a set of projections 195 that protrude at least partially into apertures 184 to actively dislodge the seed from those apertures. When the seed is dislodged (such as seed 171), it is illustratively moved by the seed tube 120, seed delivery system 166 (some examples of which are shown above in FIGS. 2-3 and below in FIGS. 5-10) to the furrow 162 in the ground.

Figure 5:
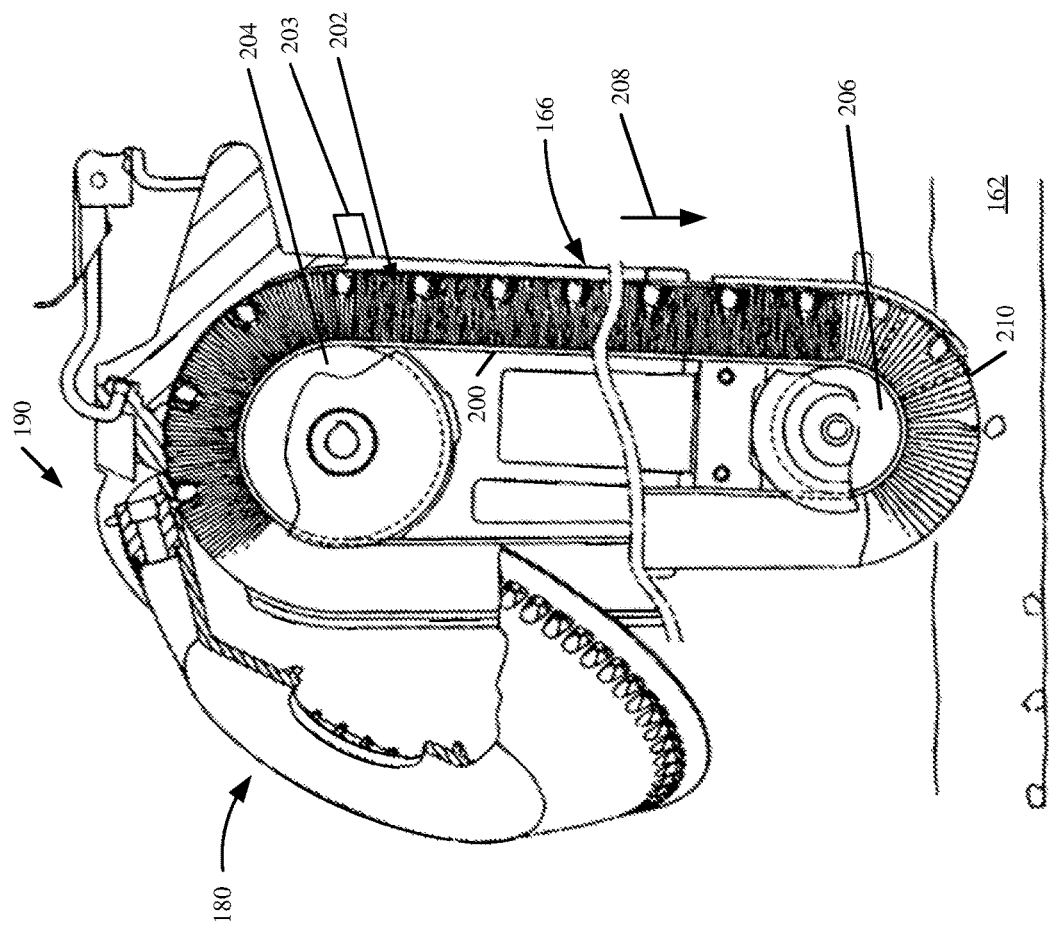
FIG. 5 shows an example of a seed delivery system that can be used with a seed metering system.

FIG. 5 shows an example where the rotating element 180 is positioned so that its seed discharge area 190 is above, and closely proximate, seed delivery system 166. In the example shown in FIG. 5, seed delivery system 166 includes a transport mechanism such as a belt 200 with a brush that is formed of distally extending bristles 202 attached to belt 200 that act as a receiver for the seeds. Belt 200 is mounted about pulleys 204 and 206. One of pulleys 204 and 206 is illustratively a drive pulley while the other is illustratively an idler pulley. The drive pulley is illustratively rotatably driven by a conveyance motor, which can be an electric motor, a pneumatic motor, a hydraulic motor, etc. Belt 200 is driven generally in the direction indicated by arrow 208

Therefore, when seeds are moved by rotating element 180 to the seed discharge area 190, where they are discharged from the seed cells in rotating element 180, they are illustratively positioned within the bristles 202 by the projections 182 that push the seed into the bristles. Seed delivery system 166 illustratively includes walls that form an enclosure around the bristles, so that, as the bristles move in the direction indicated by arrow 208, the seeds are carried along with them from the seed discharge area 190 of the metering mechanism, to a discharge area 210 either at ground level, or below ground level within a trench or furrow 162 that is generated by the furrow opener 114 on the row unit 106.

Additionally, a seed sensor 203 is also illustratively coupled to seed delivery system 166. As the seeds are moved in bristles 202 past sensor 203, sensor 203 can detect the presence or absence of a seed as will be discussed below. It should also be noted that while the present description will proceed as having sensors 119, 122, 193 and/or 203, it is expressly contemplated that, in another example, only one sensor is used. Or additional or different combinations of sensors can also be used.

Figure 6:
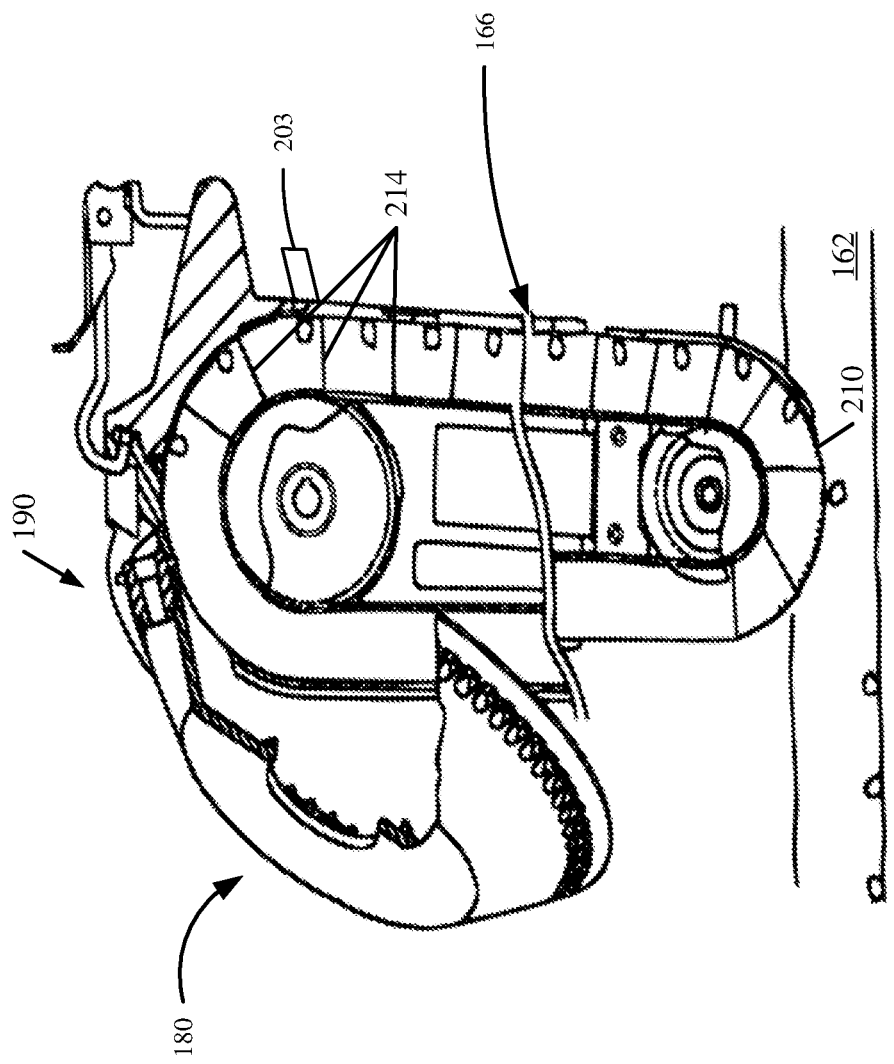
FIG. 6 shows another example of a seed delivery system that can be used with a seed metering system.

FIG. 6 is similar to FIG. 5, except that seed delivery system 166 is not formed by a belt with distally extending bristles. Instead, it is formed by a flighted belt (transport mechanism) in which a set of paddles 214 form individual chambers (or receivers), into which the seeds are dropped, from the seed discharge area 190 of the metering mechanism. The flighted belt moves the seeds from the seed discharge area 190 to the exit end 210 of the flighted belt, within the trench or furrow 162.

There are a wide variety of other types of delivery systems as well, that include a transport mechanism and a receiver that receives a seed. For instance, they include dual belt delivery systems in which opposing belts receive, hold and move seeds to the furrow, a rotatable wheel that has sprockets which catch seeds from the metering system and move them to the furrow, multiple transport wheels that operate to transport the seed to the furrow, an auger, among others. The present description will proceed with respect to a brush belt, a flighted belt and/or a seed tube, but many other delivery systems are contemplated herein as well.

Before continuing with the description of sensing planting characteristics based on the seed sensor signal, a brief description of some examples of seed sensors 119, 122, 193 and 203 will first be provided. Sensors 122, 193 and 203 are illustratively coupled to seed metering system 124 and seed delivery system 120, 166. In one example, sensors 122, 193 and 203 are seed sensors that are each mounted at a sensor location to sense a seed within seed tube 120, seed metering system 124 and delivery system 166, respectively, as the seed passes the respective sensor location. In one example, sensors 122, 193 and 203 are optical or reflective sensors and thus include a transmitter component and a receiver component. The transmitter component emits electromagnetic radiation, into seed tube 120, seed metering system 180 and/or delivery system 166. In the case of a reflective sensor, the receiver component then detects the reflected radiation and generates a signal based on the reflected radiation, and indicative of the presence or absence of a seed adjacent to sensor 122, 193 and 203. With other sensors, radiation such as light, is transmitted through the seed tube 120, seed metering system 124 or the delivery system 166 at a location generally aligned to cross the travel path of a seed. A receiver is mounted to an opposite side of the travel path of the seed. When the light beam is interrupted by a seed, the sensor signal varies, to indicate a seed. Thus, each sensor 122, 193 and 203 generates a seed sensor signal that pulses or otherwise varies, and the pulses or variations are indicative of the presence of a seed passing the sensor location proximate the sensor.

For example, in regards to sensor 203, bristles 202 pass sensor 203 and are colored to absorb a majority of the radiation emitted from the transmitter. As a result, absent a seed, reflected radiation received by the receiver is relatively low. Alternatively, when a seed passes the sensor location where sensor 203 is mounted, more of the emitted light is reflected off the seed and back to the receiver, indicating the presence of a seed. The differences in the reflected radiation allow for a determination to be made as to whether a seed is, in fact, present. Additionally, in other examples, sensors 122, 193 and 203 can include infrared sensors, a camera and image processing logic that allow visual detection as to whether a seed is currently present within seed metering system 124 seed tube 120 and/or seed delivery system 166, at the sensor location proximate the sensor. They can include an array of transmitters and/or receivers that provide signals indicative of seed presence. They can include a wide variety of other sensors as well.

In addition, sensor 119 can be formed like one of the sensors described above or differently. Sensor 119, however, illustratively performs in-trench seed sensing. It can sense seed presence, seed orientation, seed position (such as whether the seed is in proper position in the v-shaped trench 162 or sitting on top of residue), etc. For example, an optical or IR sensor can distinguish between soil surface and residue surface. If the seed is on residue surface, this information can be used to control such things as down force, planter speed, down force on opener 114, etc. Also, while sensor 119 is shown in a particular location in the FIGS., it can be in any location where it can perform in-trench seed sensing. Those locations shown are shown for example only.

Figure 7:
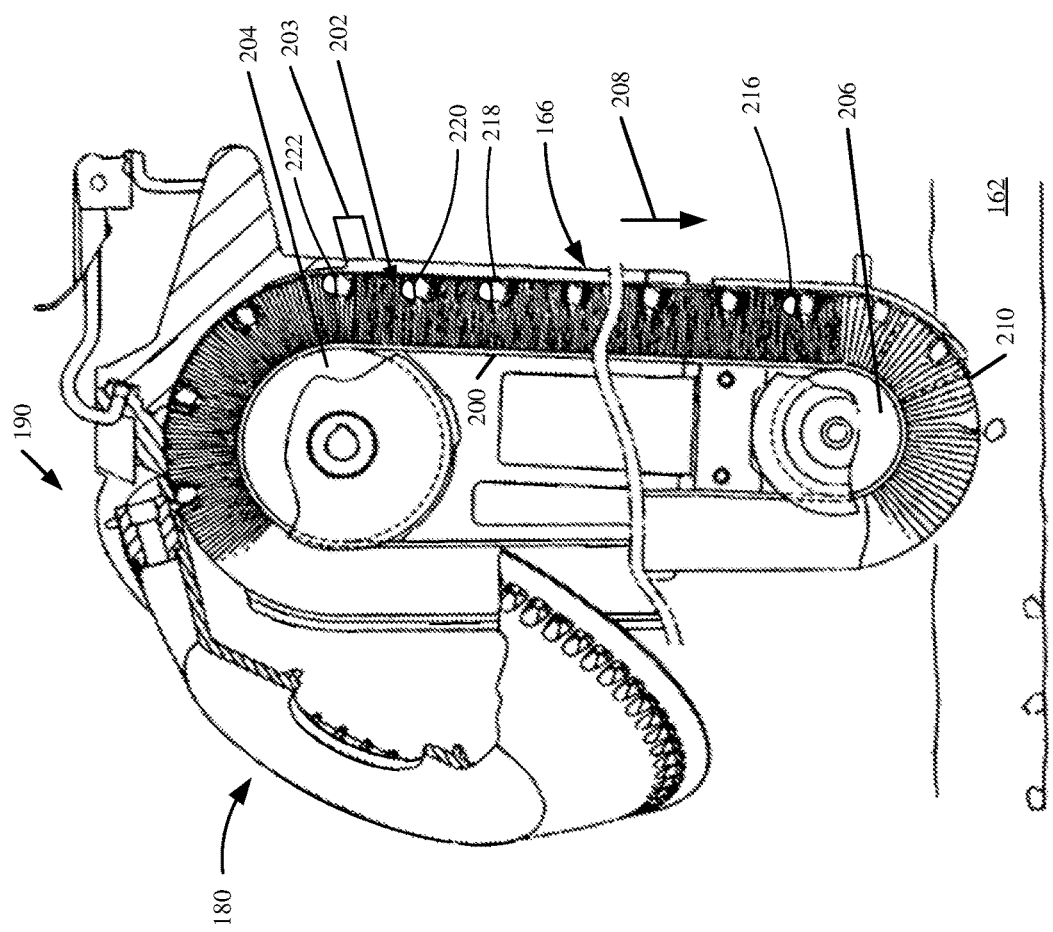
FIGS. 7-10 show examples of seed slugging in a seed delivery system.

FIG. 7 shows a seed delivery system that is similar to that shown in FIG. 5, and similar items are similarly numbered. However, as shown in FIG. 7, the seeds being delivered by the bristles 202 in the brush belt have formed a number of different clusters (also referred to as slugs). Some clusters are shown at 216, 218, 220 and 222. There may be a variety of different reasons why seed clusters (or seed slugs) are formed in the delivery system. In one example, it may be that the brush belt or bristles 202 have worn to a point where the seeds can roll within the delivery system 166 to form slugs. In one example, as referred to herein, a slug is a grouping of seeds in the delivery system where the seeds are closely proximate, or adjacent, one another, where the seeds are intended to be, instead, singulated or spaced by a desired distance. In another example, the seed metering system 124 may be worn or malfunctioning so that it is delivering more than one seed at a time into the seed delivery system. In yet another example, it may be that some foreign matter or moisture has entered the seed tank, causing the seeds to clump together or otherwise adhere to one another in an undesirable way.

Figure 8:
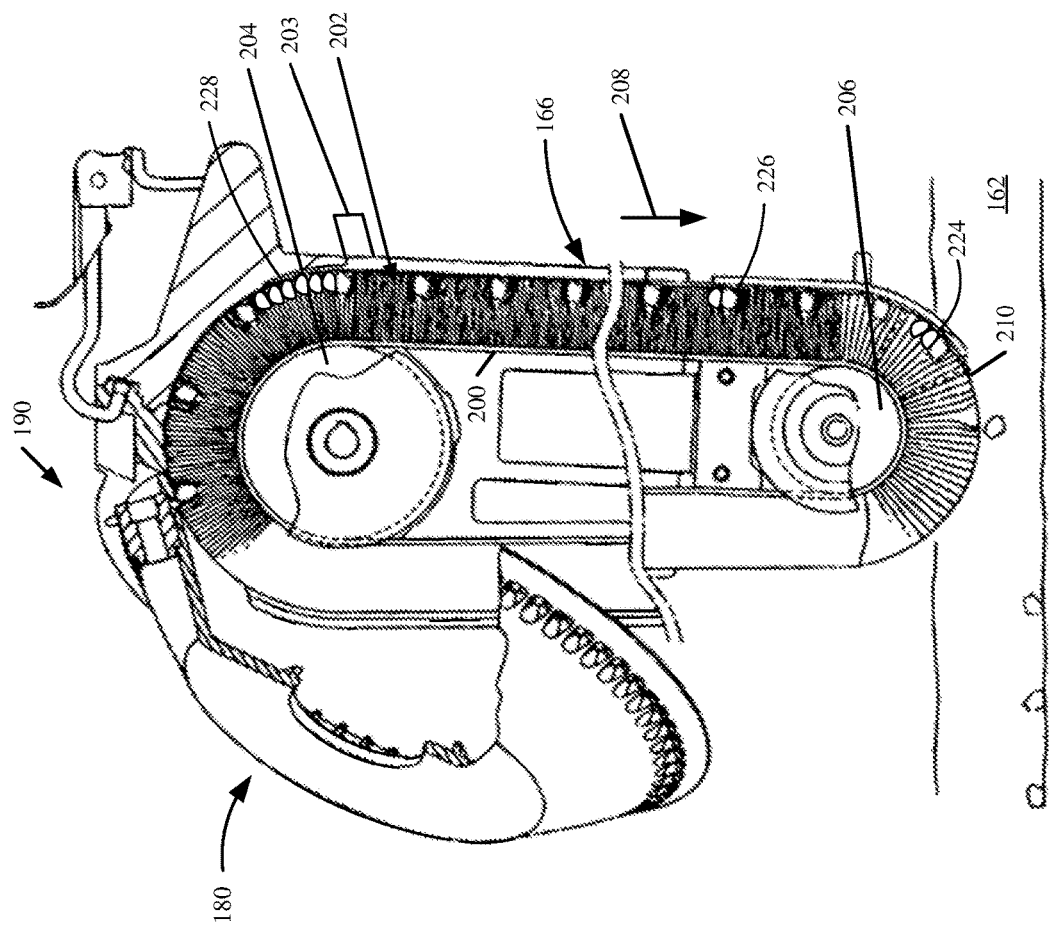

As the condition that caused the seed slugging worsens, the slugs can become more frequent, and larger. FIG. 8 is similar to FIG. 7 and similar items are similarly numbered. However, FIG. 8 shows that a number of different seed slugs 224, 226 and 228 are now formed in the delivery system. The seed slugs are illustratively increasing in size and frequency of occurrence.

Figure 9:
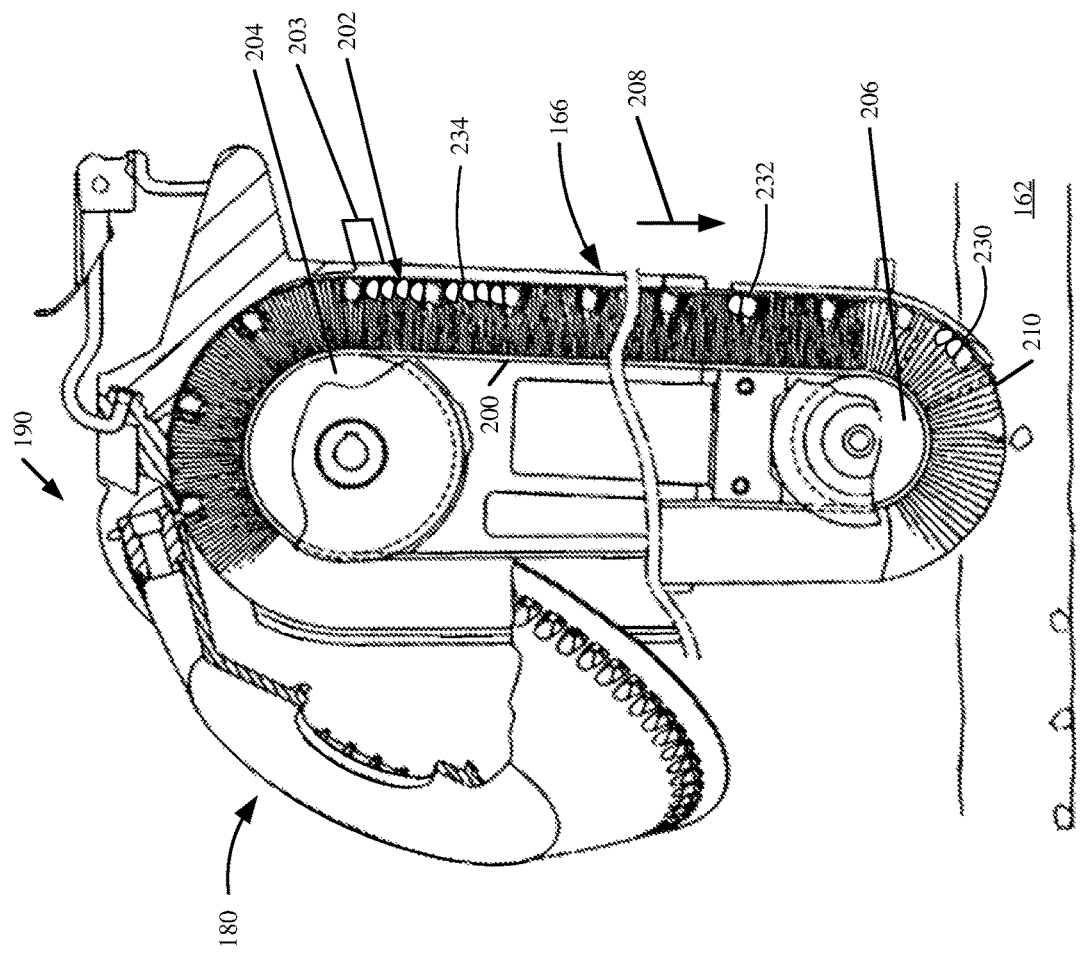
Figure 10:
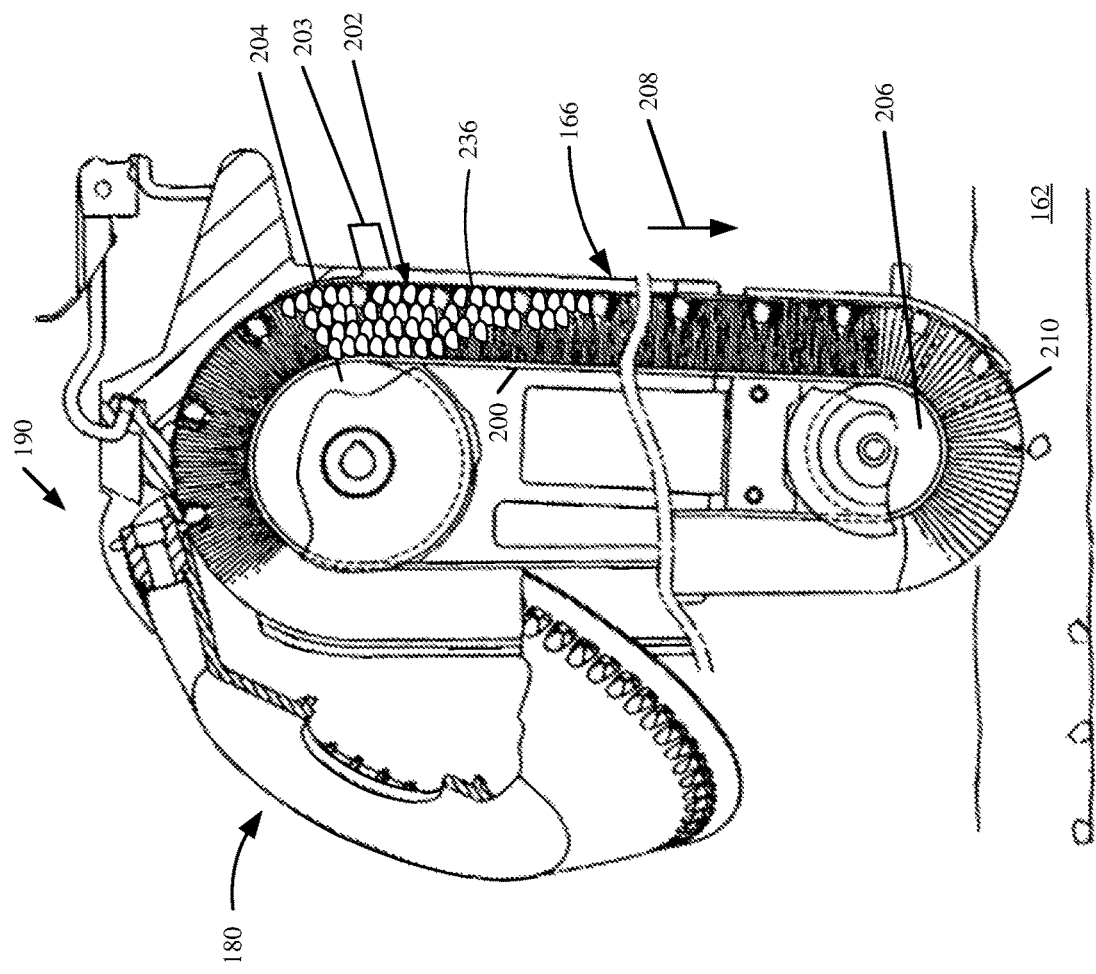

FIG. 9 is similar to FIG. 8, and similar items are similarly numbered. However, FIG. 9 shows that the seed slugs are continuing to increase in size and frequency so that, slugs 230, 232 and 234 are occurring close to one another, and are increasing in size over those shown in previous FIGS. This can continue until seed delivery system 166 becomes completely plugged or clogged. One example of this is shown in FIG. 10. It can be seen in FIG. 10 that a seed slug 236 has grown to such a size that it is completely plugging the seed delivery system 166.

These same types of seed misplacements can also be detected by sensor 119. However, instead of detecting them in the seed delivery system, they are detected in the trench 162.

Figure 11:
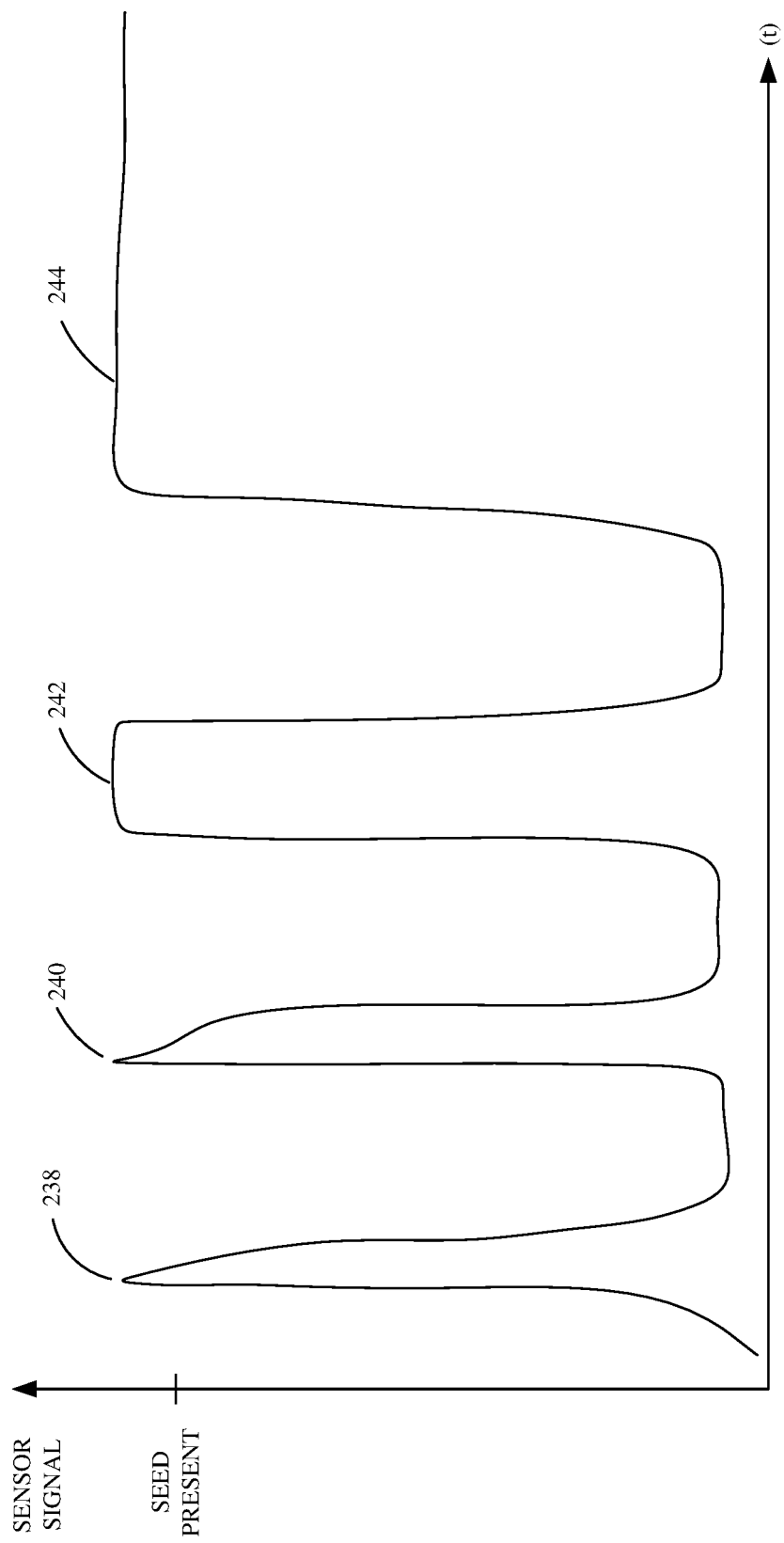
FIG. 11 shows one example of a seed sensor signal indicative of seed slugging.

It is currently quite difficult for an operator to know that slugging or plugging is occurring. It will be noted, though, that the sensor signal output by seed sensor 203 will have characteristics that vary when slugging or plugging occurs. FIG. 11 is an example of a graph showing the value of a seed sensor signal (e.g., in volts) graphed along the y-axis and time graphed along the x-axis. In the example illustrated in FIG. 11, sensor 203 is a reflective type sensor so that the output signal will have a higher value (indicating more reflected radiation), that exceeds a seed present value, when a seed is currently being sensed. In the example shown in FIG. 11, the peaks 238 and 240 have a relatively narrow peak width (or signal width) that is continuously above the seed present value that indicates that a seed is present (or is being sensed by sensor 203). Thus, the peaks 238 and 240 in FIG. 11 are indicative of a single seed being sensed.

Peak 242, however, is wider than peaks 238 and 240 in that it has a signal width that is continuously above the seed present value and that is wider than the signal width of peaks 238 and 240 that is continuously above the seed present value. Therefore, in one example, when the seed sensor signal has a peak width (or signal width) such as that shown at peak 242, this indicates that multiple seeds are bunched together, as they pass seed sensor 203. This is an indication of slugging. Similarly, the width of peak 244 (or the signal width continuously above the seed present value) is even greater than the width of peak 232. This indicates that a larger slug (or possibly a complete plug) is occurring in the seed delivery system 166. Thus, as will be described below with respect to FIGS. 13-16, analyzing the seed sensor signal, and particularly the peak width (or signal width continuously above the seed present value) output by the seed sensor, can give an indication as to whether slugging or plugging is occurring.

For purposes of the present description, the terms peak width and signal width will be used interchangeably. They, in one example, refer to a time span during which the seed sensor signal continuously meets the seed present value.

In addition, performing peak width analysis (also referred to as signal width analysis) to identify whether multiple seeds are bunching together as they pass seed sensor 203 can be done in order to determine how frequently slugging is occurring. If it is occurring with increasing frequency, this may be indicative of an undesirable condition in the row unit, such as brush belt wear, such as the intrusion of foreign matter or moisture into the system, such as meter malfunction, etc. Similarly, if the peak widths in the sensor signal are sufficiently wide (e.g., as compared to an expected value or threshold value), this may also indicate that large seed slugs are being formed or that plugging is occurring in the seed delivery system. Thus, action can be taken based on the analysis of the seed sensor signal.

Figure 12:
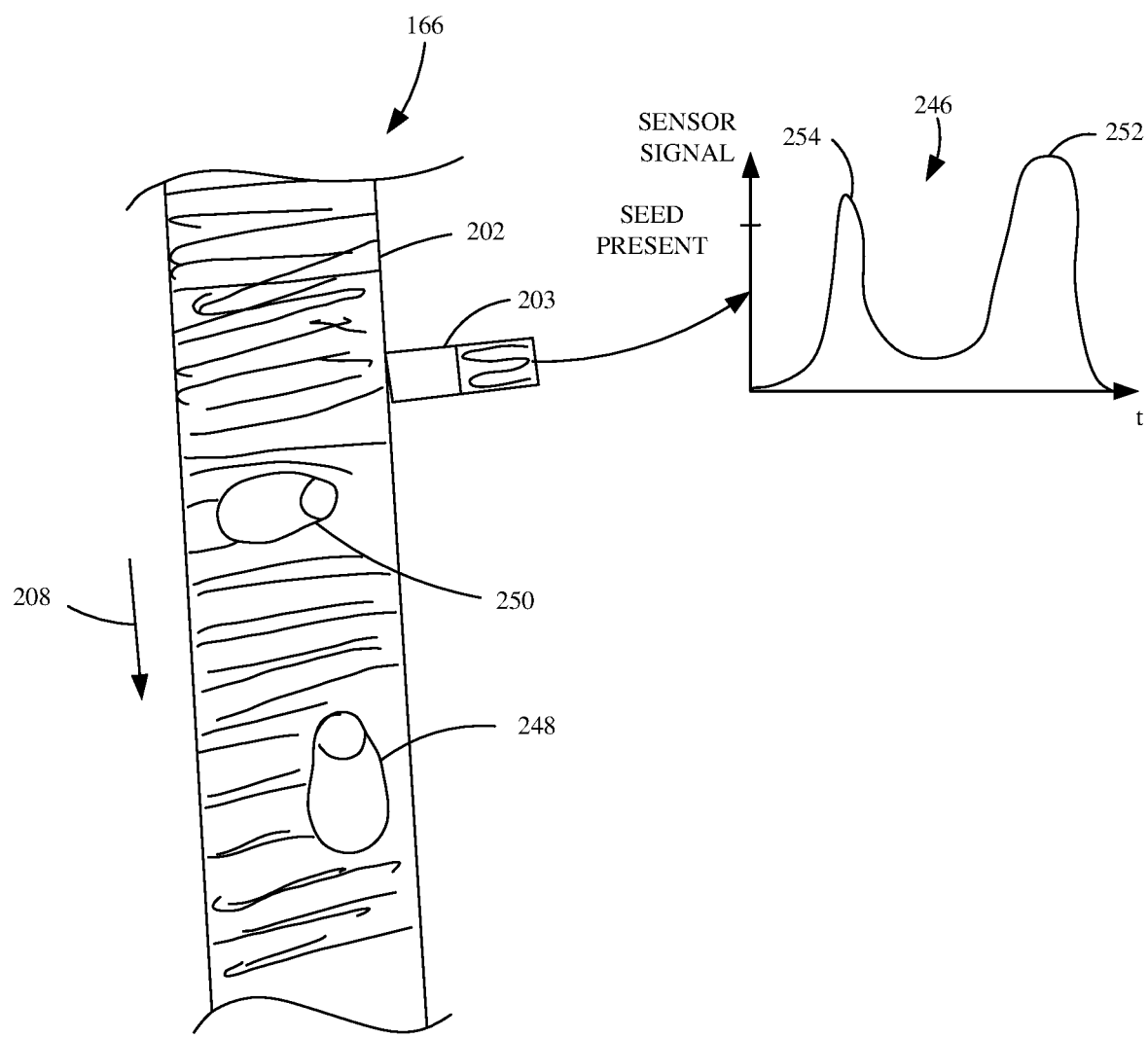
FIG. 12 shows one example of a seed sensor signal indicative of a seed orientation.

FIG. 12 shows an enlarged portion of seed delivery system 166. It also shows an example graph of the seed sensor signal generally at 246. Again, the graph 246 shows the value (e.g., in volts) of the seed sensor signal along the y-axis and time along the x-axis. In the example shown in FIG. 12, the bristles 202 in delivery system 166 are carrying elongate seeds, such as corn seeds. FIG. 12 shows two different seeds 248 and 250 that are being carried in the bristles 202 of the brush belt that forms part of seed delivery system 166.

FIG. 12 shows that the elongate seeds 248 and 250 are being carried in two different orientations. Seed 248 is oriented in the bristles 202 of seed delivery system 166 so that its elongate axis is generally aligned with the direction of travel indicated by arrow 208. Seed 250, on the other hand, is oriented so that its elongate axis is transverse to the direction of travel indicated by arrow 208. The seed sensor signal shown at graph 246 shows that a first peak 252 corresponds to a position in time when seed 248 was passing seed sensor 203. It can be seen that the peak width (or signal width) of peak 252 is relatively wide. The seed sensor signal 246 also shows that a second peak 254 occurred more recently, and corresponds to a position in time when seed 250 was passing seed sensor 203. It can be seen that the peak width (or signal width) of peak 254 is narrower than that of peak 252. This is because the amount of time that seed sensor 203 was sensing the presence of a seed, when seed 248 was passing it, is longer than the amount of time it was sensing the presence of a seed, when seed 250 was passing it, due to the different orientations of the two seeds 248 and 250.

Thus, as is described below, seeds that have an elongate axis may have different orientations when they are traveling through delivery system 166. By analyzing the peak width of the seed sensor signal generated by sensor 203, the orientation of the seeds can be detected. Various different control operations can be performed based on the detected seed orientation.

Another characteristic can also be detected using the seed sensor signal generated from seed sensor 203. It may be that the crop seeds have a different spectral characteristic (e.g., color) than similarly sized seeds that are weeds or some seed other than the intended crop seeds. For example, soybean seeds are relatively light, while nightshade seeds, although they are a similar size to soybean seeds, are relatively dark. Because the seeds are similar in size, it can be difficult for a mechanical mechanism to sort out nightshade seeds from soybean seeds. Thus, the seed metering system may be metering weed seeds instead of crop seeds.

However, the characteristic of the sensor signal generated by seed sensor 203 can indicate this as well. For instance, if seed sensor 203 is an image sensor or another sensor that is sensitive to the spectral characteristics of the seeds that it is sensing, the seed sensor signal can have characteristics that identify when an anomalous seed is detected (such as a seed that has a spectral characteristic that differs significantly from a crop seed). A number of actions can be taken when this is detected. For example, the location of the anomalous seeds can be mapped for later application of herbicide. Also, the rate at which seeds are being planted (e.g., the population) can be temporarily increased to accommodate for the anomalous seed that was planted. These are just examples.

Figure 13:
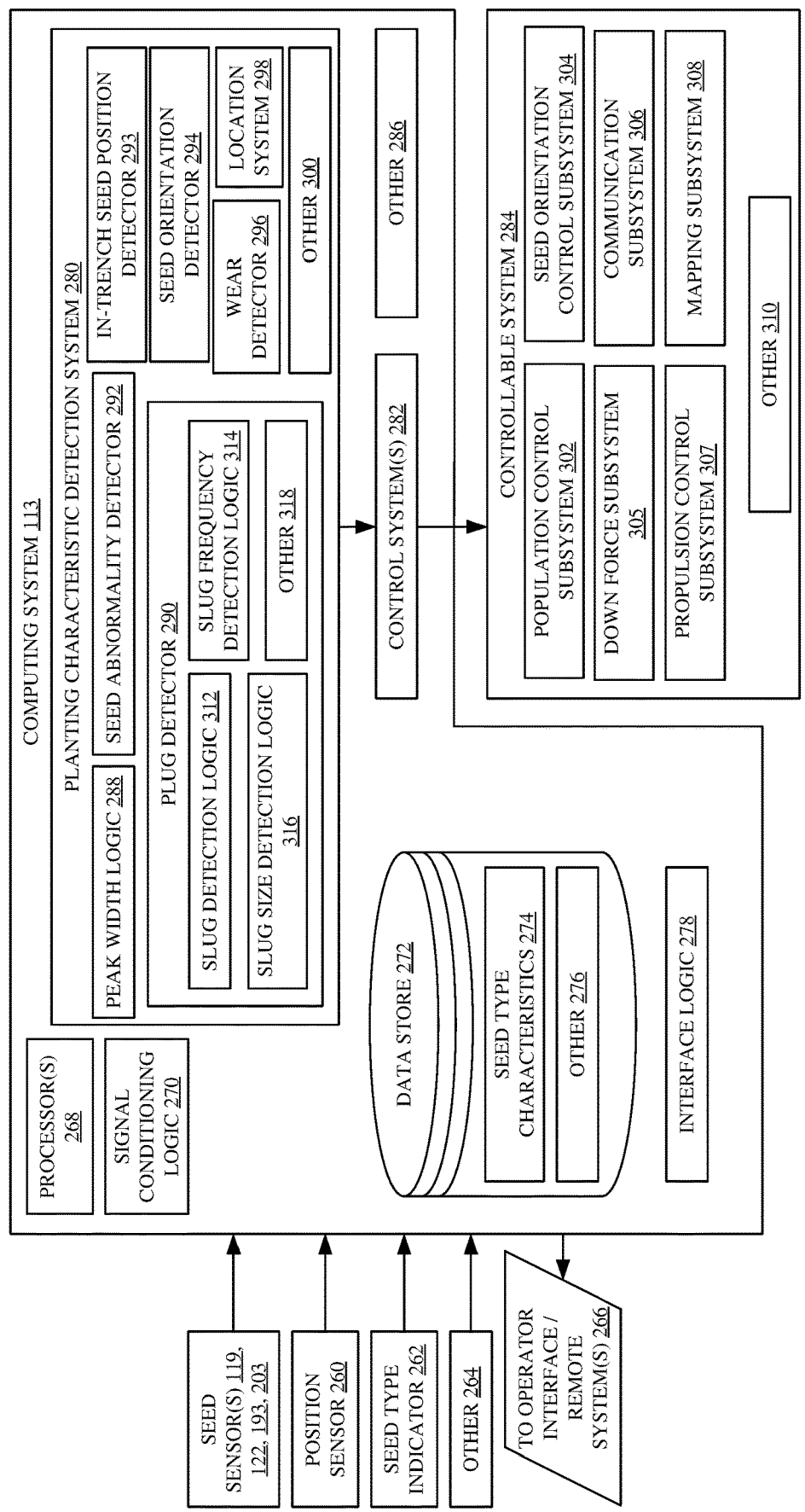
FIG. 13 is a block diagram of one example of a computing system.

FIG. 13 is a block diagram of one example of computing system 113. FIG. 13 shows that computing system 113 is receiving seed sensor signals from one or more seed sensors 119, 122, 193 and 203. For purposes of example, the present discussion will proceed with respect to the sensor being sensor 203. This is an example only, and a wide variety of other seed sensor signals can be received as well.

FIG. 13 also shows that computing system 113 can receive an input from a position sensor 260. Position sensor 260 may be, for instance, a GNSS receiver (e.g., a GPS receiver, a GLONASS receiver, etc.) or another type of position sensor. It may be a position sensor that senses position using cellular triangulation, dead reckoning, etc. FIG. 13 also shows that computing system 113 can receive a seed type indicator 262 that can be the output of a seed type detector, or it can be input by the operator, or received in other ways. The seed type indicator 262 will illustratively include the type of crop, the particular hybrid, and/or other seed characteristics. FIG. 13 shows that computing system 113 can receive inputs from a wide variety of other items 264 as well.

System 113 illustratively generates outputs 266 that can be provided to an operator interface mechanism 96 for interaction by operator 92. It can also provide outputs that are provided to other systems, such as remote systems, or other computing systems.

In the example shown in FIG. 13, computing system 113 illustratively includes one or more processors 268, signal conditioning logic 270, data store 272 (which can store seed type characteristics 274 and other items 276), interface logic 278, planting characteristic detection system 280, control system 282, controllable subsystems 284, and it can include a wide variety of other items 286. Planting characteristic detection system 280 can include peak width logic 288, plug detector 290, seed abnormality detector 292, in-trench position detector 293, seed orientation detector 294, wear detector 296, location system 298, and it can include a wide variety of other items 300. Plug detector 290 can include slug detection logic 312, slug frequency detection logic 314, slug size detection logic 316 and it can include other items 318. Controllable subsystems 284 can include population control subsystem 302, seed orientation control subsystem 304, down force subsystem 305, communication subsystem 306, propulsion control subsystem 307, mapping subsystem 308, and it can include a wide variety of other items 310. Before describing the operation of computing system 113 in more detail, a brief description of some of the items in computing system 113, and their operation, will first be provided.

Signal conditioning logic 270 illustratively receives the various signals input to computing system 113 and can perform conditioning operations. For instance, it can perform amplification, filtering, linearization, normalization, etc. The conditioned signals can then be provided to various other items in computing system 113, such as planting characteristic detection system 280.

System 280 can use peak width logic 288 to perform peak width analysis on the sensor signals from one or more of the various seed sensors. Plug detector 290 can receive the output of the peak analysis and use slug detection logic 312 to identify whether slugging or clumping or other grouping of the seeds is occurring. Slug frequency detection logic 314 can detect the frequency with which that slugging or clumping or other grouping is occurring. It can also detect whether the frequency is increasing, decreasing, whether it has increased over a threshold level, etc. Slug size detection logic 316 can detect the size of the slugs, clumps or other groupings of seeds as they pass by the seed sensor. It can identify the risk that a plug will develop. It can do this, for instance, by using the peak width analysis results provided by peak width logic 288. Plug detector 290 can perform other operations using other items 318 as well.

Based upon the output from plug detector 290, wear detector 296 can determine whether the slugs or clumps are indicative of wear that has occurred in the delivery system, the metering system or other parts of machine 100. For instance, it may be that certain slugging or grouping characteristics are indicative of different types of wear. If the machine is planting soybeans, for instance, and the slugging gradually increases over time, this may indicate that the bristles 202 on the brush belt are wearing to a significant degree. However, if the slugging or grouping appears very quickly, and the slugs or groups are relatively large, this may indicate a different type of wear or performance issue with the machine. Wear detector 296 can identify the different types of wear conditions that are occurring, based on the output of plug detector 290, by using a dynamic model that models wear of the various systems in the machine, by using a lookup table or another mechanism that correlates the output of plug detector 290 to different wear conditions, or it can do this in other ways.

If the sensor is performing in-trench sensing, then in-trench seed position detector 293 can generate signals indicating whether the seed is properly positioned within the trench 162, or whether it is misplaced (in terms of seed spacing, in terms of position in the center of the trench 162 or offset to one side, or sitting on residue, etc.). These are examples only.

Seed orientation detector 294 can identify the orientation of the seeds based upon the seed sensor signals, and/or based upon the output of peak width logic 288. For instance, if the seed type indicator 262 identifies a seed type that has an elongate axis, then the peak width analysis performed on the seed sensor will be indicative of the orientation of the seeds being sensed. Seed orientation detector 294 can generate an output indicative of the orientation of the seeds.

Seed abnormality detector 292 can perform spectral analysis or other types of analyses on the seed sensor signals to determine whether there is an anomalous or abnormal seed that is being detected. As discussed above, detector 292 can perform a spectral analysis on the seed sensor signal to determine whether the spectral characteristics of the seed being detected are consistent with the crop being planted, as indicated by the seed type indicator 262. Those characteristics can be stored as seed type characteristics 274. Detector 292 can generate an output indicating when an anomalous or abnormal seed is being detected.

Location system 298 can identify the location of the machine when the various outputs generated by planting characteristics detection system 280 are generated. In this way, the location of the machine when slugs or plugging occurred, when anomalous seeds were planted, when performance issues arose, etc., can be identified.

Control system 282 can receive inputs from the sensors and other items in computing system 113 and generate control signals to control any of the controllable subsystems 284, or other items. For instance, when seed abnormality detector 292 detects that abnormal or anomalous seeds are being planted, control system 282 can generate a control signal to control the population control subsystem 302 to temporarily increase the seed population being planted in order to make up for the anomalous or abnormal seeds that were planted. This may be, for instance, increasing the speed at which the metering system meters the seeds and/or increasing the speed at which the delivery system delivers the seeds. Control system 282 can also receive an input from location system 298 and generate control signals to control mapping subsystem 208 to map the locations where the abnormal or anomalous seeds were planted, so that those locations can be targeted for later herbicide application. It can also control mapping subsystem 308 to map any of the other items detected by planting characteristic detection system 280.

Control system 282 can receive an output from seed orientation detector 292 and generate control signals to control seed orientation control subsystem 304. For instance, a seed orientation control subsystem may be configurable or variable to change the orientation of the seeds, as they enter the seed delivery system. Where a particular orientation is deemed to be favorable over other orientations, then the seed orientation control subsystem can be controlled to bias the seeds into that favorable orientation, as they enter the seed delivery system so that they are placed in the furrow 162 in the desired orientation.

Control system 282 can also receive the outputs from planting characteristic detection system 280 and control communication subsystem 306 to generate a communication to operator 92, using operator interface mechanism 96. It can control the communication subsystem 306 to communicate with remote computing systems, with a farm manager computing system, a vendor or manufacturer computing system, with a maintenance person's computing system, etc.

By way of example, where control system 282 receives an input from wear detector 296 indicating that the delivery system or another part of machine 100 has undergone wear, and it needs maintenance, communication subsystem 306 can automatically generate a communication to a maintenance person's computing system indicating that the next time machine 100 is serviced, the delivery system or other part of machine 100 should be serviced as well. Similarly, control system 282 can generate control signals to control communication subsystem 306 to display an alert to operator 92 indicating that the machine is plugged, that it is slugging, or indicating other compromised performance issues. These are examples only.

Interface logic 278 illustratively allows computing system 113 to interface with other computing systems, with towing vehicle 94, with remote computing systems, etc. Interface logic 278 can also receive inputs from the other computing systems and provide an indication of those inputs to computing system 113.

If control system 282 receives signals from in-trench seed position detector 293 that the seed is sitting on the residue, it can control down force subsystem 305 to modify the down force on opener 114, on gauge wheels 116, etc. It can control propulsion control system 307 to control the speed of the tractor or to otherwise control the ground speed of machine 100.

Figure 14:
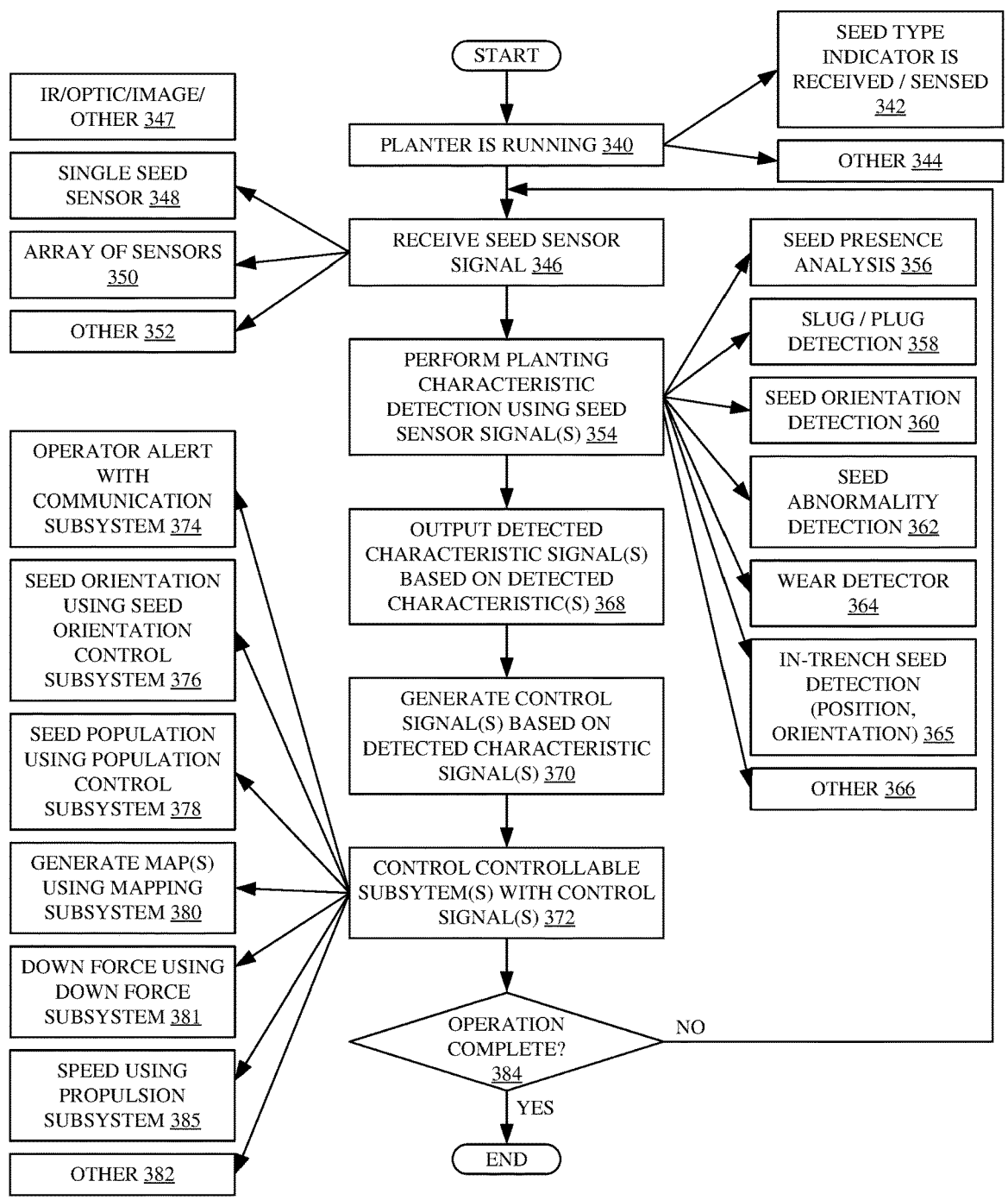
FIG. 14 is a flow diagram illustrating one example of the operation of the computing system shown in FIG. 13 in detecting planting characteristics, based on the seed sensor signal and generating control signals.

FIG. 14 is a flow diagram illustrating one example of the operation of computing system 113 in detecting planting characteristics based on the seed sensor signal and controlling the controllable subsystems based upon those detected characteristics. It is first assumed that the planter 100 is running. This is indicated by block 340. Computing system 113 can then receive inputs from various items, such as the seed type indicator 262 which can be an input from an operator, or it can be sensed, or received in a different way. This is indicated by block 342. The computing system 113 can receive a wide variety of other inputs 344, such as the position sensor input 260, or other inputs.

Computing system 113 also receives the seed sensor signal from one or more of the seed sensors 119, 122, 193 and 203. This is indicated by block 346. The seed sensor signal can be from an IR, optic, image or other sensor, as indicated by block 347. It can be generated from a single seed sensor per row unit, as indicated by block 348, or it can be from an array or other arrangement of multiple seed sensors per row unit, as indicated by block 350. The seed sensors can be reflective seed sensors, transmissive seed sensors, image sensors, spectral sensors, or any of a wide variety of other seed sensors, as described above. The seed sensors can be arranged in other ways as well, and this is indicated by block 352.

Computing system 113 then performs planting characteristic detection using the seed sensor signals. This is indicated by block 354 in the flow diagram of FIG. 14. Peak width logic 288 can analyze the peak width of the seed sensor signal, or another characteristic of the seed sensor signal that indicates seed presence. This is indicated by block 356 in the flow diagram of FIG. 14. Plug detector 290 can then perform slug or plug detection. This is indicated by block 358. This is also described in more detail below with respect to FIG. 15.

Seed orientation detector 294 can detect seed orientation. This is indicated by block 360 and it is also discussed in more detail below with respect to FIG. 15.

Seed abnormality detector 292 can detect seed anomalies or abnormalities. This is indicated by block 362 in the flow diagram of FIG. 14. As discussed above, this can be done based on a spectral analysis, based upon an image analysis, or in other ways.

Wear detector 296 can detect whether there are wear conditions occurring on machine 100, based on the seed sensor signal. This is indicated by block 364. In-trench seed position detector 293 can perform in-trench seed detection, as indicated by block 365. Planting characteristic detection system 280 can detect any of a wide variety of other planting characteristics, based on the seed sensor signal, as well. This is indicated by block 366.

Planting characteristic detection system 280 then outputs detected characteristic signals based upon the various planting characteristics that have been detected. These signals can be provided to control system 282, or to other items. Outputting the detected characteristic signals is indicated by block 368 in the flow diagram of FIG. 14

Control system 282 then generates control signals, to control one or more of the various controllable subsystems 282, or other subsystems. Generating control signals based on the detected characteristic signals is indicated by block 370 in the flow diagram of FIG. 14.

The control signals are applied to the controllable subsystems 284 in order to control the controllable subsystems 284 using the control signals. This is indicated by block 372. As examples, control system 282 can control communication subsystem 306 to communicate an operator alert to operator 92, of any or all of the various planting characteristics detected by system 280. This is indicated by block 374 in the flow diagram of FIG. 14.

Control system 282 can also control seed orientation control subsystem 304 in order to control the orientation of the seeds being planted. This is indicated by block 376 in the flow diagram of FIG. 14.

Control system 282 can control the population control subsystem 302 in order to increase or decrease the seed population, temporarily or for a longer period of time, based upon the detected planting characteristics. This is indicated by block 378 in the flow diagram of FIG. 14. Control system 282 can control mapping subsystem 308 to generate maps of the various planting characteristics detected. This is indicated by block 380.

Control system 282 can control various down force components on the row unit by controlling down force subsystem 300. This is indicated by block 381. It can control the ground speed of machine 100 by controlling propulsion subsystem 307, as indicated by block 383.

It will be appreciated that control system 282 can control any of a wide variety of subsystems 310 as well. This can be done in order to perform any of a wide variety of other control operations based upon the detected planting characteristics. This is indicated by block 382 in the flow diagram of FIG. 14.

Computing system 113 can continue to perform in this way until the planting operation is complete or until other criteria are met. This is indicated by block 384 in the flow diagram of FIG. 14.

Figure 15:
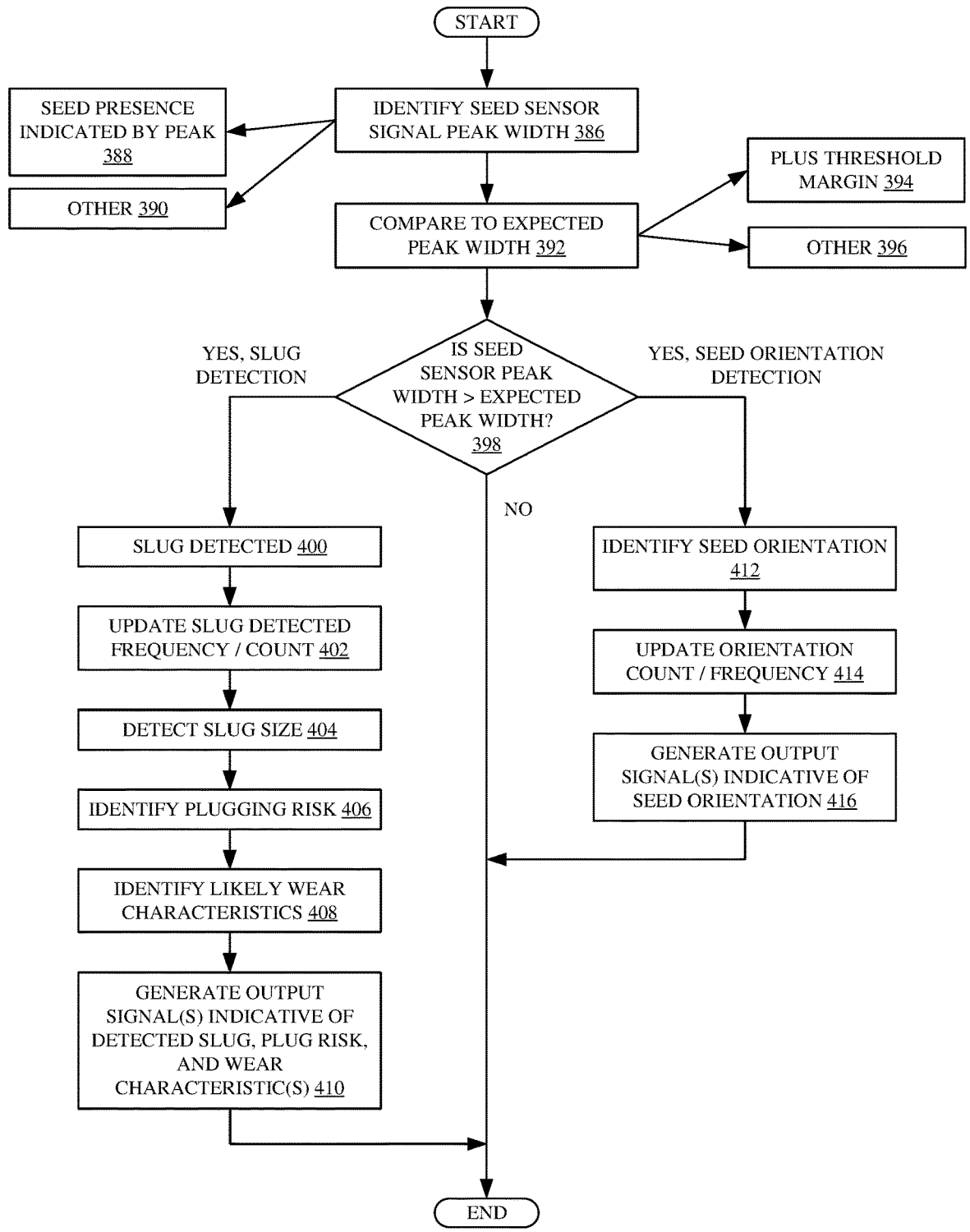
FIG. 15 is a flow diagram showing one example of the operation of a plug detector, a seed orientation detector and a wear detector.

FIG. 15 is a flow diagram illustrating one example of the operation of plug detector 290 and the operation of seed orientation detector 294, in more detail. It is first assumed that the seed sensors 122, 193 and 203 indicate the presence of or absence of a seed based upon a signal that reaches a sufficient amplitude, at its peak, to demonstrate that a seed is present. This, of course, is only one type of seed sensor and it is described for the sake of example only. Given this example, peak width logic 288 receives the seed sensor signal and identifies the seed sensor signal peak width. This is indicated by block 386 in the flow diagram of FIG. 15. As mentioned above, this assumes that the seed sensor signal demonstrates seed presence based upon the amplitude or magnitude of the seed sensor signal, at its peak, or that it at least reaches a threshold level, at its peak. This is indicated by block 388. Identifying the seed sensor signal peak width can be done in other ways as well, and this is indicated by block 390.

In one example, peak width logic 288 compares the width of the peak of the seed sensor signal (e.g., the amount of time that it is above the "seed present" threshold value) to an expected peak width for a single seed detection. This is indicated by block 392. The expected peak width can be predefined and stored as a seed type characteristic 274, or it can be determined dynamically. This comparison can be made, taking into account a threshold margin or tolerance value as well. This is indicated by block 394 in the flow diagram of FIG. 15. The peak width can be analyzed against an expected peak width in other ways as well, and this is indicated by block 396.

If the detected peak width of the seed sensor signal is consistent with the expected peak width, then this indicates that a single seed (or a singulated seed) has been detected. In that case, it may be that no further analysis or characteristic detection is performed with respect to that signal. However, if, as indicated by block 398, it is determined that the peak width of the seed sensor is greater than the expected peak width (or is otherwise inconsistent with it), then slug detection logic 312 can determine that a slug or other undesirable seed grouping, has been detected. This is indicated by block 400.

Slug frequency detection logic 314 can update a frequency value that indicates how frequently the slugs or seed groupings are being detected. This is indicated by block 402. Instead of updating a slug frequency, it may simply update a count of the number of slugs or undesirable seed groupings that are detected. This is also indicated by block 402.

Slug size detection logic 316 can also detect the size of the slug, based upon the length of time that the seed sensor signal is continuously above the seed detection value (e.g., based upon the size of the peak width or signal width of the seed sensor signal). Detecting the slug size is indicated by block 404. Plug detector 290 can also determine, based upon the frequency, the size of the slug, etc., whether the delivery system is in fact plugged, or is at risk of plugging. This may be done, for instance, by identifying that the frequency of slug detection is increasing as is the size of the detected slugs. Identifying a plugging risk can be done in other ways as well, and this is indicated by block 406 in the flow diagram of FIG. 15.

Based upon the information generated by slug detection logic 312, slug frequency detection logic 314 and size detection logic 316, and perhaps the output of peak width logic 288, wear detector 296 can identify likely wear characteristics that are occurring. This is indicated by block 408. For instance, the signals from plug detector 290 and peak width logic 288 may be correlated to different wear patterns or different wear circumstances that occur, and that give rise to the different types of plugging and peak width characteristics of the seed sensor signal. These correlations may be captured in a model or lookup table stored in data store 272 or they can be captured in a dynamic correlation mechanism such as a machine learned classifier or set of equations. Thus, wear detector 296 may identify certain types of wear that are likely taking place based upon that information from detector 290 and logic 288 and/or other inputs.

Planting characteristic detection system 280 then generates output signals indicative of the detected plug and wear characteristics. This is indicated by block 410. Those signals can be provided to other items in planting detection system 280 and/or to control system 282 or other items.

When seed orientation detection is to be performed then, at block 398 the seed sensor signal peak width can be compared to a first expected value corresponding to the seed being in a first orientation with its elongate axis transverse to the direction of travel. The peak width of the seed sensor signal can also be compared at block 398 to a second expected value corresponding to the seed being in a second orientation with its elongate axis parallel to the direction of travel. If the peak width is greater than that second expected value, then slugging may be occurring and processing continues at block 400. If not, however, then seed orientation detector 294 can identify the seed orientation based on the sensor signal. This is indicated by block 412.

For purposes of the present example, it is assumed that the seed being planted has an elongate axis. Then, if seed orientation is to be detected, the peak width can be compared against the first expected peak width value for a seed oriented such that its elongate axis is transverse to the direction of travel of the seed delivery system. If the peak width of the seed sensor signal is consistent with (e.g., the same as, within a tolerance) the first expected value, then the seed is likely oriented with the elongate axis transverse to, or less aligned with, the direction of travel. If it is greater than the first expected peak width value, then the peak width of the sensor signal can be compared to the second expected value. If the sensor signal has a peak width that is consistent with the second expected value, then this will indicate that the seed is likely oriented with its elongate axis generally parallel to, or otherwise generally aligned with, the direction of travel.

Seed orientation detector 294 can monitor seed orientation, because this may be used in determining whether action is to be taken. For instance, if it is desired that the seeds are planted in a particular orientation, then seed orientation detector 294 can identify how often they are in that orientation, relative to other, undesired orientations. When a seed is detected in one orientation or the other, it can update an orientation count or frequency variable that indicates how often the seeds are in the different orientations. This is indicated by block 414. It can also generate output signals indicative of seed orientation, the frequency that the seeds are in each of the orientations, or other signals. This is indicated by block 416. Again, these signals can be provided to control system 282 to control any of the various controllable subsystems 284.

Figure 16:
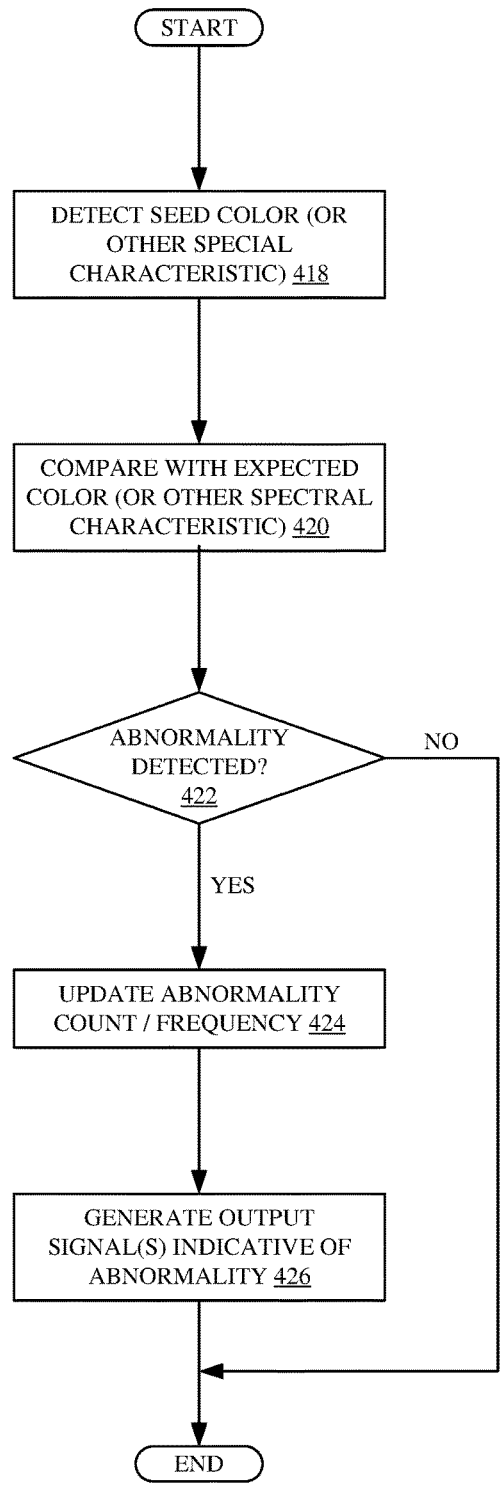
FIG. 16 is a flow diagram showing one example of the operation of a seed abnormality detector.

FIG. 16 is a flow diagram illustrating one example of the operation of seed abnormality detector 292 in detecting anomalous or abnormal seeds based on the seed sensor signal. In one example, it first detects seed color (or another spectral characteristic) of the seed, based upon the seed sensor signal. This is indicated by block 418 in the flow diagram of FIG. 16.

It then compares the detected color or spectral characteristic with an expected color or spectral characteristic for the crop seeds being planted. This is indicated by block 420 in the flow diagram of FIG. 16. If an abnormality is detected with respect to the sensed color or spectral characteristic, then seed abnormality detector 292 can also update a variable indicative of the count of abnormalities, or the frequency with which they are detected. This is indicated by blocks 422 and 424 in the flow diagram of FIG. 16. It can generate output signals indicative of the fact that an abnormal or anomalous seed has been detected, the count and/or frequency with which anomalous or abnormal seeds have been detected, and other items. Control system 282 can then generate control signals based upon that information. Generating output signals indicative of detected abnormalities is indicated by block 426 in the flow diagram of FIG. 16.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 17:
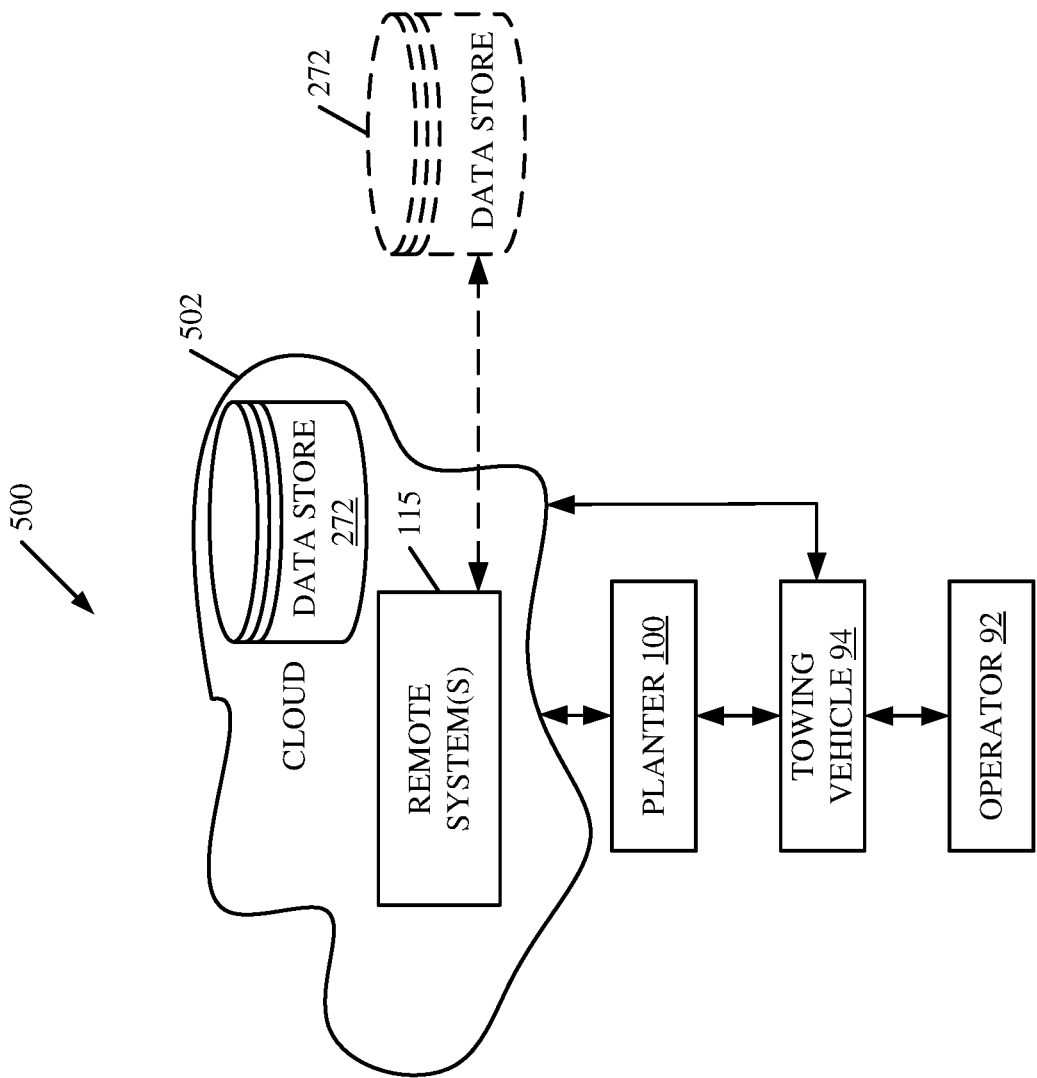
FIG. 17 shows one example of the architecture illustrated in FIGS. 1 and 13, deployed in a remote server environment.

FIG. 17 is a block diagram of the architecture, shown in FIG. 1, except that it communicates with elements in a remote server architecture 500. In an example, example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 17 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 17, some items are similar to those shown in FIGS. 1 and 13 and they are similarly numbered. FIG. 17 specifically shows that remote system(s) 115 and/or data store 272 can be located at a remote server location 502. Therefore, system 113 accesses those systems through remote server location 502.

FIG. 17 also depicts another example of a remote server architecture. FIG. 17 shows that it is also contemplated that some elements of FIGS. 1 and 13 can be disposed at remote server location 502 while others are not. By way of example, data store 272 can be disposed at a location separate from location 502, and accessed through the remote server at location 502. Regardless of where they are located, they can be accessed directly by system 113, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the planter comes close to the fuel truck for fueling, the system automatically collects the information from the planter using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the planter until the planter enters a covered location. The planter, itself, can then send the information to the main network.

It will also be noted that the elements of FIGS. 1 and 13, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 18:
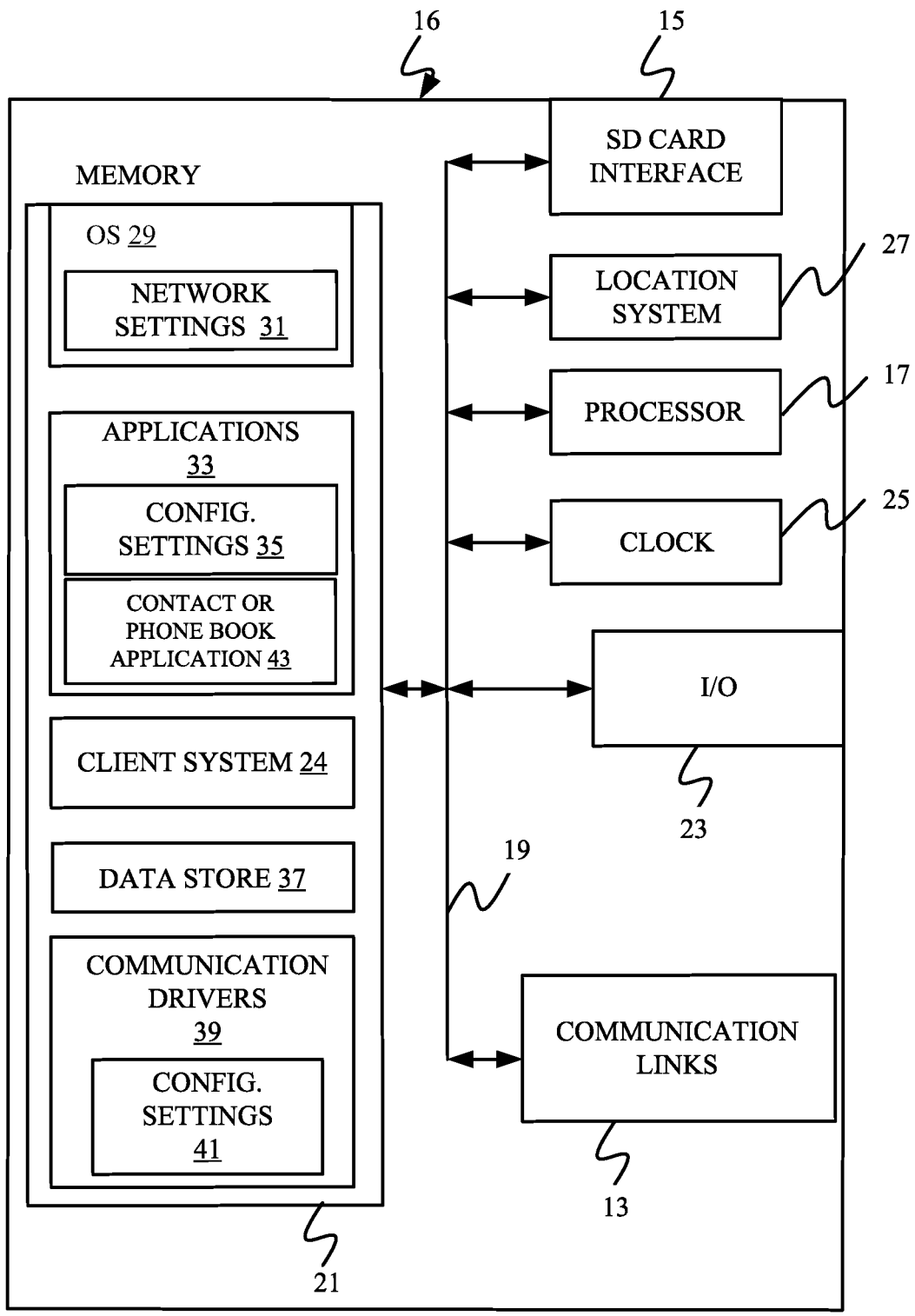
FIGS. 18-20 show examples of mobile devices that can be used as operator interface mechanisms in the architectures shown in the previous Figures.
Figure 19:
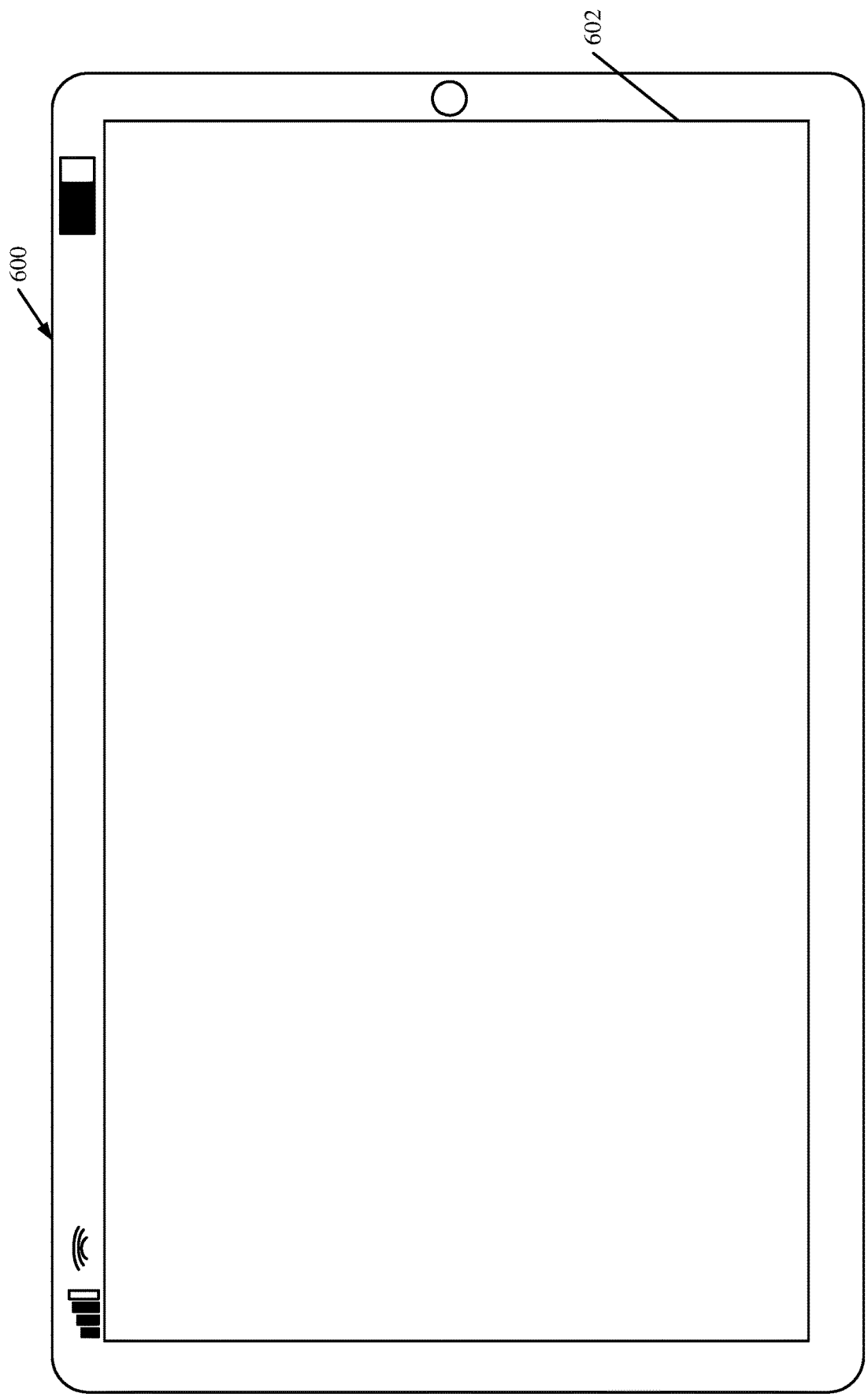
Figure 20:
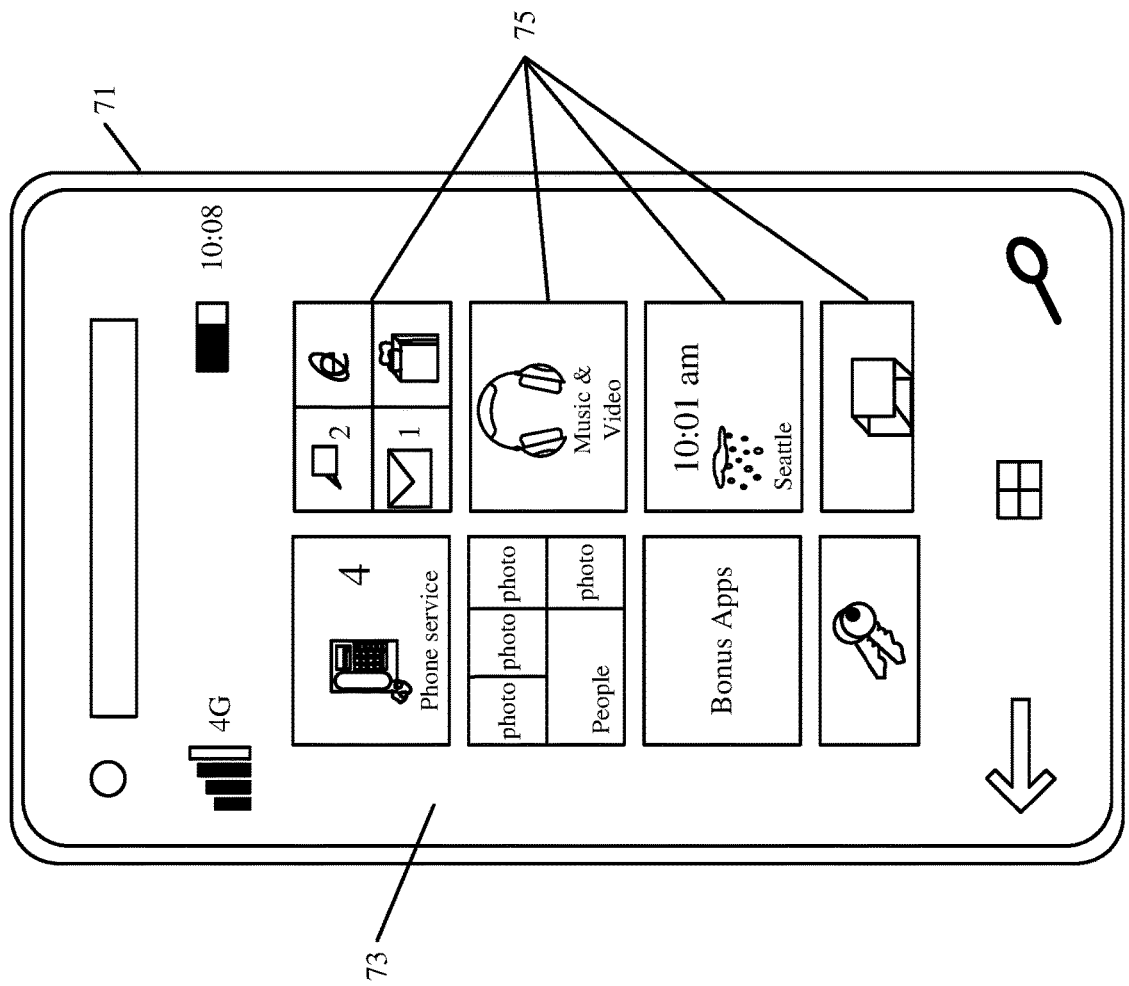

FIG. 18 is a simplified block diagram of one illustrative example of a handheld or mobile computing device that can be used as a user's or client's hand held device 16, in which the present system (or parts of it) can be deployed. For instance, a mobile device can be deployed in the operator compartment of towing vehicle 94 for use in generating, processing, or displaying the planting characteristics or other information. FIGS. 19-20 are examples of handheld or mobile devices.

FIG. 18 provides a general block diagram of the components of a client device 16 that can run some components shown in FIGS. 1 and 13, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 19 shows one example in which device 16 is a tablet computer 600. In FIG. 19, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 620 can also illustratively receive voice inputs as well.

FIG. 20 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 21:
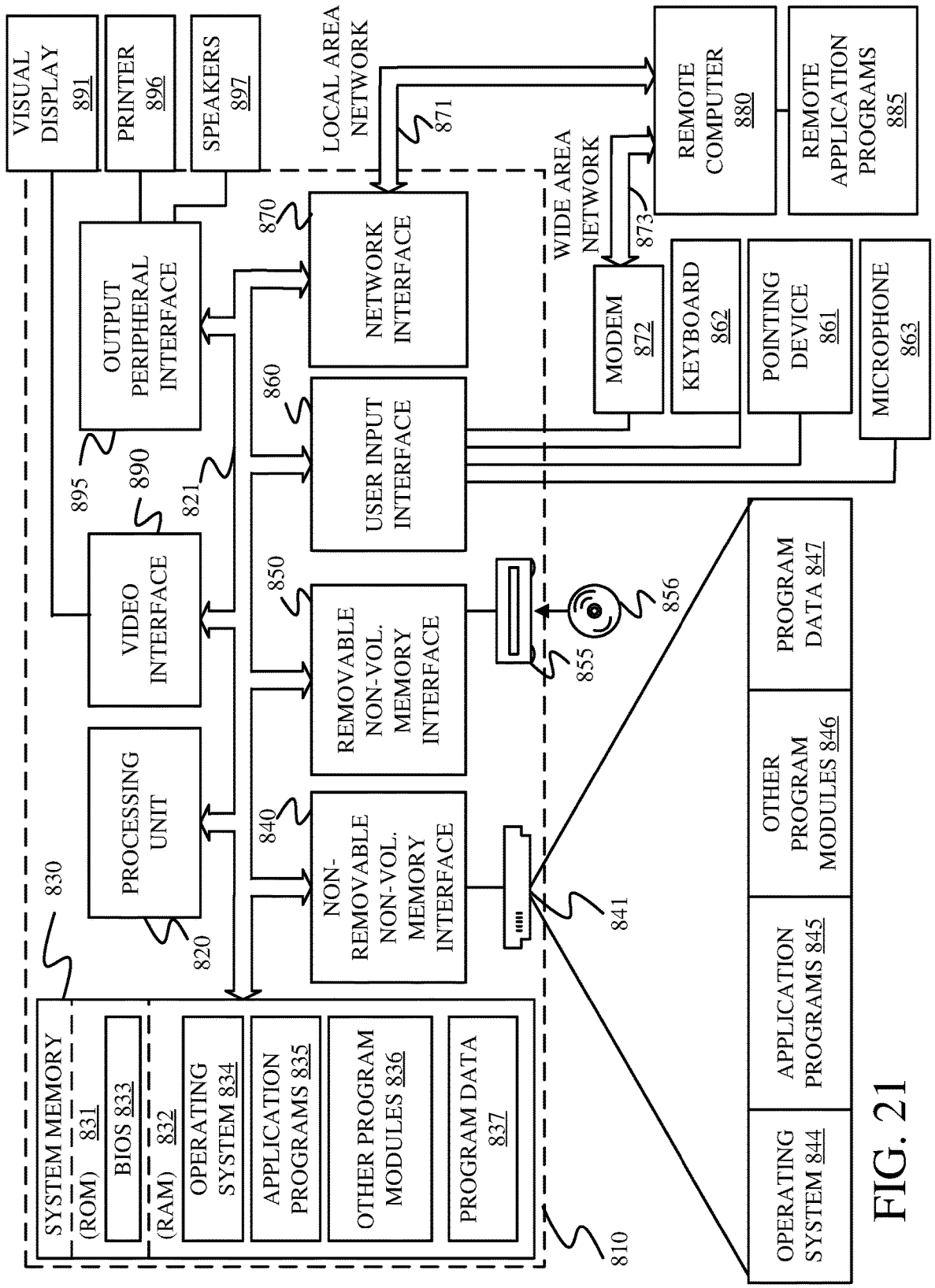
FIG. 21 is a block diagram showing one example of a computing environment that can be used in the architectures shown in the previous Figures.

FIG. 21 is one example of a computing environment in which elements of FIGS. 1 and 13, or parts of it, (for example) can be deployed. With reference to FIG. 21, an example system for implementing some embodiments includes a general-purpose computing device in the form of a computer 810. Components of computer 810 may include, but are not limited to, a processing unit 820 (which can comprise processors from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1 and 8 can be deployed in corresponding portions of FIG. 21.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 21 illustrates operating system 834, application programs 835, other program modules 836, and program data 837.

The computer 810 may also include other removable/non-removable volatile/nonvolatile computer storage media. By way of example only, FIG. 21 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 21, provide storage of computer readable instructions, data structures, program modules and other data for the computer 810. In FIG. 21, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network-WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 21 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural machine comprising:
   a furrow opener configured to open a furrow as the agricultural machine moves across a field;
   a seed delivery system configured to deliver seeds to the furrow;
   a seed sensor configured to sense a seed and to generate a seed sensor signal indicative of the seed; and
   a seed abnormality detector configured to detect a spectral characteristic of the seed based on the seed sensor signal and to identify a seed abnormality based on the detected spectral characteristic.

2. The agricultural machine of claim 1 and further comprising:
   a control system configured to generate a control signal to control a controllable subsystem based on the seed abnormality.

3. The planting machine of claim 2, wherein the controllable subsystem comprises a population control subsystem.

4. The agricultural machine of claim 3, wherein the control system is configured to generate the control signal to control the population control subsystem to increase a speed of the seed delivery system.

5. The agricultural machine of claim 3, wherein the control system is configured to generate the control signal to control the population control subsystem to increase a speed of a seed metering system, the seed metering system configured to meter seeds to the seed delivery system.

6. The agricultural machine of claim 1, wherein the seed sensor comprises an image sensor that is configured to generate, as the seed sensor signal, an image of the seed.

7. The agricultural machine of claim 1, wherein the seed abnormality detector is configured to compare the detected spectral characteristic of the seed to a seed type spectral characteristic, and to identify the seed abnormality based on the comparison.

8. A method of controlling an agricultural machine comprising:
   generating, with a seed sensor, a seed sensor signal indicative of seed detected moving through the agricultural machine;
   detecting, with a seed abnormality detector, a spectral characteristic of the seed based on the seed sensor signal;
   identifying a seed abnormality based on the detected spectral characteristic of the seed; and
   generating a controllable subsystem of the agricultural machine based on the seed abnormality.

9. The method of claim 8, wherein the controllable subsystem comprises a population subsystem and wherein generating the control signal comprises:
   generating the control signal to control the population subsystem of the agricultural machine to temporarily increase a speed at which a seed delivery system is configured to deliver seeds to a furrow.

10. The method of claim 8, wherein the controllable subsystem comprises a population subsystem and wherein generating the control signal comprises:
    generating the control signal to control the population subsystem of the agricultural machine to temporarily increase a speed at which a seed metering system meters seeds to a seed delivery system.

11. The method of claim 8, wherein generating the seed sensor signal comprises capturing an image of the seed, with the seed sensor, as the seed is moving through the agricultural machine.

12. The method of claim 8, wherein identifying the seed abnormality comprises identifying that the seed detected moving through the agricultural machine is of a different type than a type of the seed that is to be delivered to a furrow opened by the agricultural machine.

13. An agricultural machine comprising:
    a furrow opener configured to open a seed furrow as the agricultural machine moves across a field during a planting operation;
    a seed delivery system configured to deliver seeds to the furrow;
    a seed sensor configured to sense a seed and to generate a seed sensor signal indicative of the seed; and
    a seed orientation detector configured to detect an orientation of the seed in the seed delivery system based on the seed sensor signal and to generate a characteristic signal indicative of a detected planting characteristic.

14. The agricultural machine of claim 13 and further comprising:
    a control system configured to generate a control signal to control a controllable subsystem based on the detected orientation of the seed.

15. The agricultural machine of claim 14, wherein the controllable subsystem comprises a seed orientation subsystem being configurable to change an orientation of the seeds being delivered to the seed delivery system, and wherein the control system is configured to generate the control signal to control the seed orientation subsystem to change an orientation of the seeds being delivered to the seed delivery system.

16. The agricultural machine of claim 13, wherein the seed sensor is configured to generate the seed sensor signal at a value that varies from a first level indicative of a seed not being detected to a second level indicative of a seed being detected, and wherein the agricultural machine further comprises:

signal width logic that identifies a signal width value indicative of a time for which the seed sensor signal has a value that continuously meets or exceeds the second level.

17. The agricultural machine of claim 13 and further comprising:

a planting characteristic detection system configured to detect, as a characteristic of the planting operation, that a spacing of seeds within the seed delivery system does not satisfy a target spacing.

\* \* \* \* \*